(12) United States Patent
Hsu et al.

(10) Patent No.: US 12,140,796 B2
(45) Date of Patent: Nov. 12, 2024

(54) FREQUENCY- AND PROCESS-INSENSITIVE SPLITTING USE MULTIPLE SPLITTERS IN SERIES

(71) Applicant: Taiwan Semiconductor Manufacturing Co., Ltd., Hsinchu (TW)

(72) Inventors: Min-Hsiang Hsu, Hsinchu (TW); Cheng-Tse Tang, Hsinchu (TW); Hau-Yan Lu, Hsinchu (TW); Yingkit Felix Tsui, Cupertino, CA (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 215 days.

(21) Appl. No.: 17/392,873

(22) Filed: Aug. 3, 2021

(65) Prior Publication Data
US 2022/0350178 A1    Nov. 3, 2022

Related U.S. Application Data

(60) Provisional application No. 63/181,490, filed on Apr. 29, 2021.

(51) Int. Cl.
*G02B 6/125* (2006.01)
*G02B 6/122* (2006.01)

(52) U.S. Cl.
CPC ............ *G02B 6/125* (2013.01); *G02B 6/1228* (2013.01)

(58) Field of Classification Search
CPC ... G02B 6/12; G02B 6/29331; G02B 6/29355
(Continued)

(56) References Cited

U.S. PATENT DOCUMENTS

| 4,902,086 A | * | 2/1990 | Henry | G02B 6/125 |
| | | | | 385/130 |
| 11,520,106 B2 | * | 12/2022 | Lee | G02B 6/1228 |

(Continued)

FOREIGN PATENT DOCUMENTS

JP    WO 2007/020924 A1 *  2/2007    ............. G02F 1/035

OTHER PUBLICATIONS

Perez-Lopez et al. "Dual-Drive Directional Couplers for Programmable Integrated Photonics" 2019 IEEE Photonics Society Summer Topical Meeting Series (SUM), published on Aug. 15, 2019.
(Continued)

*Primary Examiner* — Robert Tavlykaev
(74) *Attorney, Agent, or Firm* — Eschweiler & Potashnik, LLC

(57) ABSTRACT

In some embodiments, the present disclosure relates to a device having a first waveguide and a second waveguide arranged over a substrate. The first waveguide has a first input terminal and a first output terminal, wherein the first input terminal is configured to receive light. The second waveguide is arranged laterally beside the first waveguide and has a second input terminal and a second output terminal. The second input terminal of the second waveguide is configured to receive light. The first waveguide further includes a first portion that has a different structure than surrounding portions of the first waveguide. The second waveguide further includes a second portion that has a different structure than surrounding portions of the second waveguide. The first waveguide is spaced apart at a maximum distance from the second waveguide at the first portion and the second portion.

19 Claims, 17 Drawing Sheets

(58) Field of Classification Search
USPC .................................................... 385/14, 42
See application file for complete search history.

(56) References Cited

U.S. PATENT DOCUMENTS

| | | | | |
|---|---|---|---|---|
| 2003/0165295 | A1* | 9/2003 | Doerr | G02B 6/29355 385/39 |
| 2006/0140535 | A1* | 6/2006 | Tsuda | G02F 1/293 385/16 |
| 2006/0188197 | A1* | 8/2006 | Bulthuis | G02B 6/29395 385/39 |
| 2010/0310205 | A1* | 12/2010 | Liu | B82Y 20/00 385/12 |
| 2012/0063716 | A1* | 3/2012 | Mizuno | G02B 6/12007 385/11 |
| 2019/0196294 | A1* | 6/2019 | Liu | G01J 3/26 |
| 2021/0373241 | A1* | 12/2021 | Sun | G02B 6/29338 |
| 2022/0003928 | A1* | 1/2022 | Ravi | G02B 6/12007 |

OTHER PUBLICATIONS

Chang et al. "Design and analysis of optical coupler with a stable splitting ratio based on cascaded multistage directional couplers" Optical Engineering 51(9), 094603 (Sep. 2012), published on Sep. 6, 2012.

Wang et al. "Compact Broadband Directional Couplers Using Subwavelength Gratings" IEEE Photonics Journal, vol. 8, No. 3, Jun. 2016, published on Jun. 17, 2016.

Lu et al. "Broadband silicon photonic directional coupler using asymmetric-waveguide based phase control" Optics Express, vol. 23, No. 3, published on Feb. 9, 2015.

Chen et al. "Broadband Silicon-On-Insulator directional couplers using a combination of straight and curved waveguide sections" Scientific Reports, 7: 7246, published on Aug. 3, 2017.

John. "What Is a Fiber Optic Splitter?" FS Community, published on Dec. 7, 2012.

* cited by examiner

FREQUENCY- AND PROCESS-INSENSITIVE SPLITTING USE MULTIPLE SPLITTERS IN SERIES

REFERENCE TO RELATED APPLICATION

This application claims the benefit of U.S. Provisional Application No. 63/181,490, filed on Apr. 29, 2021, the contents of which are hereby incorporated by reference in their entirety.

BACKGROUND

Optical circuits may comprise multiple photonic functions/devices and optical waveguides. The optical waveguides are configured to confine and guide light from a first point on an integrated chip (IC) to a second point on the IC with minimal attenuation. Optical waveguides may be arranged close to one another such that light may be split and/or transferred between nearby optical waveguides. An optical waveguide may also be configured to selectively change the phase, wavelength, frequency, and/or other properties of light that passes through the optical waveguide.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
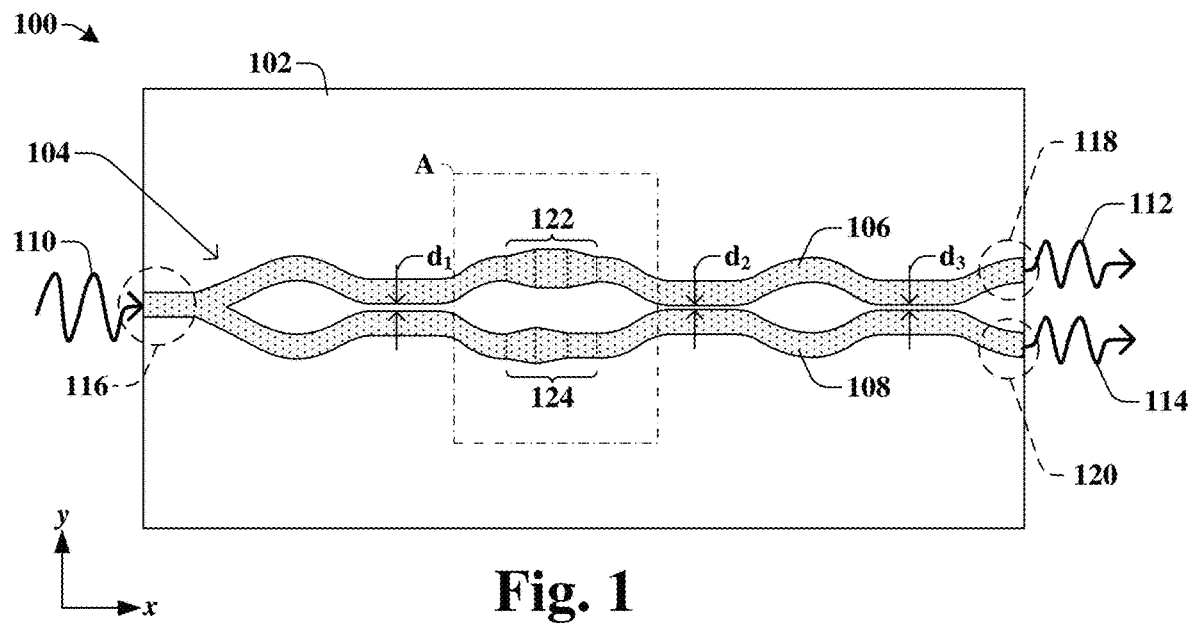
FIG. 1 illustrates a top-view of some embodiments of an optical device comprising a first waveguide optically coupled to a second waveguide, wherein the first and second waveguide each comprise portions with varying widths to stabilize a coupling ratio of the first and second waveguides.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Photonic devices relate to the transmission and/or processing of photons (e.g., light) incident on the photonic devices. Photonic devices comprise waveguides, which guide or "route" light through the photonic device. Such devices may transport broadband light that comprises many frequencies. In some instances, a photonic device comprises a first waveguide arranged beside a second waveguide that acts as a coupler and/or splitter to respectively couple and/or split light that travels between and through the first and second waveguides for data processing. The first and second waveguides may share a same input, but have different outputs. In a splitter device, the light that exits the outputs has a different power than the input light such that the splitter device can distribute power to different parts of the overall photonic device. Splitter devices may be used in various applications such as, for example, transceivers for data transmission, biosensors in medical applications, light detection and ranging (LiDAR) in automobiles, and gyroscopes in defense or space industries.

The splitting of the light depends on a coupling ratio, which indicates the relationship between the output power and the input power of light in a splitter device. The coupling ratio is at least dependent on the design (e.g., materials, spacing, dimensions, etc.) of the waveguides and frequency of the light traveling through the waveguides. To reduce the coupling ratio's sensitivity to variations in frequencies of light and also in the design of the waveguides that come naturally due to manufacturing tolerances, multi-stage directional couplers are used which comprise various mechanisms to change the wave number and achieve phase matching. Often, multi-stage directional couplers require waveguides with increased length to match some phase criterion for the coupling ratio, which ultimately takes up a lot of space on a substrate.

Various embodiments of the present disclosure relate to a more compact design of a frequency- and process-insensitive directional coupler that is configured to split broadband light with little or no frequency- or process-dependent coupling ratios. Each waveguide of the frequency and process-insensitive directional coupler comprises a phase matching portion that has a different structure (e.g., dimensions, spacing, materials, etc.) than the rest of the waveguide in order to achieve phase matching. Thus, even if the structure of one or more of the waveguides vary due to manufacturing tolerances or the wavelength of the light traveling through the waveguides varies, the phase matching portion adjusts the phase of the traveling light to a desired value such that the coupling ratio does not change significantly and the desired power splitting is achieved. The resulting coupler has a reduced size on a substrate, has small phase errors, has a flexible design, and has a robust process to reliably transport and split broadband light.

FIG. 1 illustrates a top-view 100 of some embodiments of a waveguide structure of a multi-stage directional coupler having tapered portions to achieve phase matching.

The top-view 100 of FIG. 1 comprises a waveguide structure 104 arranged within a dielectric structure 102. The dielectric structure 102 and the waveguide structure 104 are arranged over a substrate, which is not shown because the substrate is behind the dielectric structure 102 from the top-view 100 perspective. In some embodiments, the waveguide structure 104 comprises an input terminal 116, a first output terminal 118 and a second output terminal 120. A first waveguide 106 and a second waveguide 108 branch off from the input terminal 116. The first output terminal 118 is coupled to the first waveguide 106, and the second output terminal 120 is coupled to the second waveguide 108. The first and second waveguides 106, 108 comprise a semiconductor material such as, for example, silicon, and/or some other material that light can travel through such as, for example, silicon dioxide, silicon nitride, or some other suitable material.

In some embodiments, impingent light 110 is received at the input terminal 116, splits as it travels through the first and second waveguides 106, 108, and first outgoing light 112 and second outgoing light 114 exits the first output terminal 118 and the second output terminal 120, respectively. The waveguide structure 104 is designed such to achieve a certain coupling ratio which determines how the impingent light 110 is split into the first outgoing light 112 and the second outgoing light 114. In some embodiments, for example, the impingent light 110 at the input terminal 116 has 100 percent power and is equally split as it travels through the first and second waveguides 106, 108 such that the first outgoing light 112 has 50 percent of the power of the impingent light 110 and that the second outgoing light 114 has 50 percent of the power of the impingent light 110. The first waveguide 106 and the second waveguide 108 are arranged closely to one another and therefore are optically coupled to one another. Thus, as light travels through the first and second waveguides 106, 108, light may constructively or destructively interfere with one another to achieve the desired coupling ratio to split the light.

In some embodiments, the first and second waveguides 106, 108 comprise wave-like portions extending in the x- and y-directions and linear portions that extend in the x-direction. In some embodiments, it is the linear portions of the first waveguide 106 and the second waveguide 108 that arranged close to one another for optical coupling. In some instances, first linear portions of the first waveguide 106 and the second waveguide 108 are spaced apart in the y-direction by a first distance $d_1$; second linear portions of the first waveguide 106 and the second waveguide 108 are spaced apart in the y-direction by a second distance $d_2$; and third linear portions of the first waveguide 106 and the second waveguide 108 are spaced apart in the y-direction by a third distance $d_3$. In some embodiments, due to manufacturing variations, at least one of the first, second, and third distances $d_1$, $d_2$, $d_3$ differ from one another. The variations in the first, second, and third distances $d_1$, $d_2$, $d_3$ as well as other variations such as material composition and widths of the first and second waveguides 106, 108 vary the optical field at the edges of the first and second waveguides 106, 108, which may vary the coupling ratio of the overall waveguide structure 104.

Thus, the waveguide structure 104 further comprises tapered phase matching portions (122, 124) configured to adjust the phase of the traveling light through the first and second waveguides 106, 108 such that the coupling ratio has little change with manufacturing variations. In some embodiments, a first tapered phase matching portion 122 of the first waveguide 106 is arranged directly over a second tapered phase matching portion 124 of the second waveguide 108. Dotted lines in the y-direction are included on FIG. 1A for ease of visualizing the tapered segments of the first and second tapered phase matching portions 122, 124. The first and second tapered phase matching portions 122, 124 are spaced apart from one another such that optical coupling does not occur at the first and second tapered phase matching portions 122, 124; instead, the first and second tapered phase matching portions 122, 124 are isolated from one another in the y-direction such that the phase of traveling light through each of the first and second waveguides 106, 108 can be individually adjusted.

In some embodiments, the optical path difference is defined by the phase difference which is equal to $\Delta(\beta L)$, wherein $\beta$ is the wave number of the waveguide and L is the length of the waveguide. To achieve a desired coupling ratio, the waveguide structure 104 is designed to achieve a certain phase difference $\Delta(\beta L)$. For example, if a waveguide structure 104 is designed to split light from 100 percent power at the input terminal 116 to 50 percent power at each of the first and second output terminals 118, 120, then the waveguide structure 104 is designed to have a phase difference $\Delta(\beta L)$ equal to 120 degrees. To prevent the waveguide structure 104 from becoming larger which would reduce the device density and increase unwanted process variation, it is advantageous to adjust the wave number $\beta$ of the waveguide structure 104 instead of the length L of the waveguide structure 104 to achieve a desired optical path difference. The wave number $\beta$ is equal to $(2\pi n_{eff}/\lambda)$, wherein $n_{eff}$ is the effective index of the waveguide and $\lambda$ is the working wavelength. Varying the width of the first and second waveguides 106, 108 at the tapered phase matching portions (122, 124) changes the value of the effective index $n_{eff}$, which creates a phase difference $\Delta(\beta L)$. Thus, the first and second tapered phase matching portions 122, 124 are designed to achieve a desired phase difference $\Delta(\beta L)$ to reduce variation in the coupling ratio, thereby controlling the power splitting of the impingent light 110 and improving the overall reliability of the device.

Figure 2:
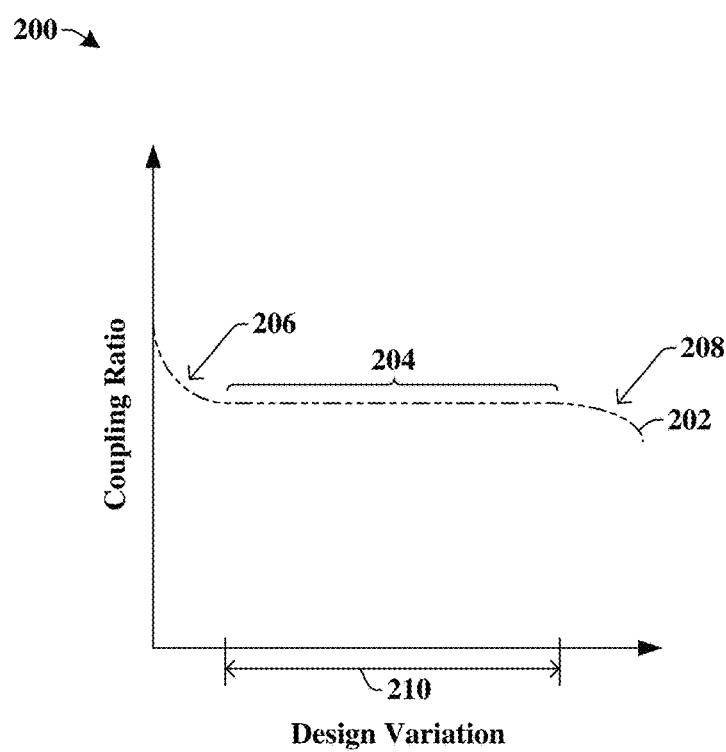
FIG. 2 illustrates a plot diagram of some embodiments of a substantially stable coupling ratio of a waveguide structure.

FIG. 2 illustrates a plot 200 of some embodiments of the change in coupling ratio versus various design variations of a waveguide structure (e.g., 104 of FIG. 1).

The plot 200 illustrates exemplary data 202 of how a coupling ratio of a waveguide structure (e.g., 104 of FIG. 1) may change as a design variation is changed. Examples of design variations include varying widths of the waveguide structure (e.g., 104 of FIG. 1), varying materials and/or material compositions of the waveguide structure (e.g., 104 of FIG. 1), varying spacing between waveguides (e.g., 106, 108 of FIG. 1) of the waveguide structure (e.g., 104 of FIG. 1), varying lengths of the waveguides (e.g., 106, 108 of FIG. 1) of the waveguide structure (e.g., 104 of FIG. 1), or some other design variation. These design variations may be due to typical variations in a structure due to manufacturing tolerances. In some embodiments, due to the phase matching portions of the waveguides (e.g., 106, 108 of FIG. 1), the data 202 comprises a plateau portion 204, wherein even when there is design variation, the coupling ratio does not change or at least does not change significantly.

In some embodiments, the plateau portion 204 of the data 202 is surrounded by, for example, a first decreasing portion 206 and a second decreasing portion 208, wherein the coupling ratio decreases as the design variation increases. The plateau portion 204 of the data 202 extends along a certain range 210 of design variation. The phase matching portions of the waveguides (e.g., 106, 108 of FIG. 1) are designed such that the plateau portion 204 of the data 202 extends over a large range 210 of design variations such that the waveguide structure (e.g., 104 of FIG. 1) splits impingent light (e.g., 110 of FIG. 1) according to a desired coupling ratio even if there is some design variation due to manufacturing.

Figure 3A:
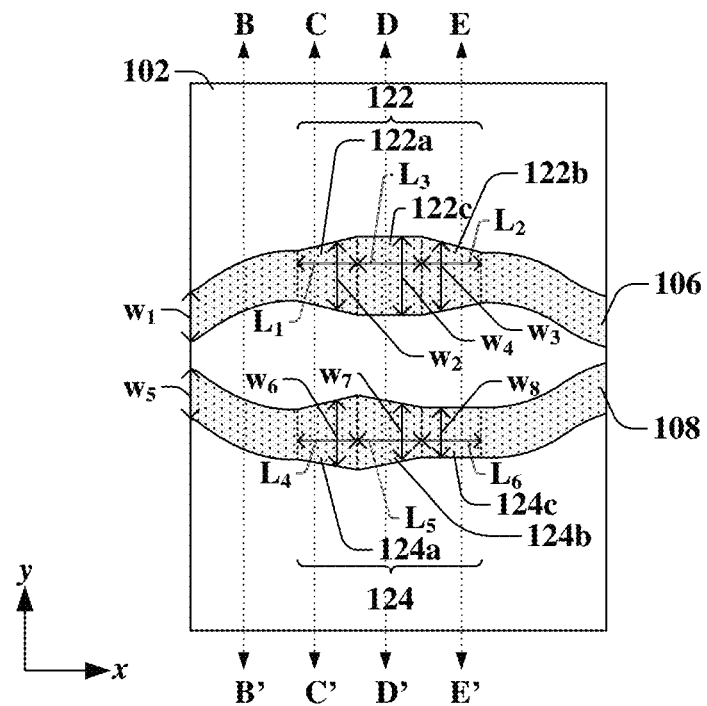
FIGS. 3A-3E and 4 illustrate various views of some more detailed views of the varying widths of the first and second waveguides presented in FIG. 1.

FIG. 3A illustrates a magnified top-view 300A of some embodiments of the first and second tapered phase matching portions 122, 124 of the waveguide structure 104. In some embodiments, the magnified top-view 300A corresponds to box A of FIG. 1.

In some embodiments, the first waveguide 106 has a first width $w_1$ measured in the y-direction between outer sidewalls of the first waveguide 106. In some embodiments, the first tapered phase matching portion 122 comprises a first segment 122a, a second segment 122b, and a third segment 122c. The first, second, and third segments 122a, 122b, 122c of the first tapered phase matching portion 122 are spaced apart by dotted lines in FIG. 3A for ease of understanding. It will be appreciated that the first tapered phase matching portion 122 may comprise more or less than three segments (122a, 122b, 122c) in other embodiments.

In some embodiments, the first segment 122a of the first tapered phase matching portion 122 has a second width $w_2$ that varies as the second width $w_2$ is measured at different points along the x-direction; the second segment 122b of the first tapered phase matching portion 122 has a third width $w_3$ that varies as the third width $w_3$ is measured at different points along the x-direction; and the third segment 122c of the first tapered phase matching portion 122 has a fourth width $w_4$ that remains substantially constant as the fourth width $w_4$ is measured at different points along the x-direction. In some embodiments, the first segment 122a has a first length $L_1$ measured in the x-direction; the second segment 122b has a second length $L_2$ measured in the x-direction; and the third segment 122c has a third length $L_3$ measured in the x-direction.

Similarly, in some embodiments, the second waveguide 108 has a fifth width $w_5$ measured in the y-direction between outer sidewalls of the second waveguide 108. In some embodiments, the second tapered phase matching portion 124 comprises a fourth segment 124a, a fifth segment 124b, and a sixth segment 124c. The fourth, fifth, and sixth segments 124a, 124b, 124c of the second tapered phase matching portion 124 are spaced apart by dotted lines in FIG. 3A for ease of understanding. It will be appreciated that the second tapered phase matching portion 124 may comprise more or less than three segments (124a, 124b, 124c) in other embodiments.

In some embodiments, the fourth segment 124a of the second tapered phase matching portion 124 has a sixth width $w_6$ that varies as the sixth width $w_6$ is measured at different points along the x-direction; the fifth segment 124b of the second tapered phase matching portion 124 has a seventh width $w_7$ that varies as the seventh width $w_7$ is measured at different points along the x-direction; and the sixth segment 124c of the second tapered phase matching portion 124 has an eighth width $w_8$ that remains substantially constant as the eighth width $w_8$ is measured at different points along the x-direction. In some embodiments, the fourth segment 122b has a fourth length $L_4$ measured in the x-direction; the fifth segment 124b has a fifth length $L_5$ measured in the x-direction; and the sixth segment 124c has a sixth length $L_6$ measured in the x-direction.

In some embodiments, the entire length of the first tapered phase matching portion 122 is equal to a sum of the first, second, and third lengths $L_1, L_2, L_3$, and the entire length of the second tapered phase matching portion 124 is equal to a sum of the fourth, fifth, and sixth lengths $L_4, L_5, L_6$. In some such embodiments, the length of the first and second tapered phase matching portions 122, 124 are about equal to conserve space over the substrate to prevent a decrease in device density and an increase in unwanted process variation which reduces reliability of the device. In some embodiments, the first through eighth widths $w_1$-$w_8$ are each within a range of between, for example, approximately 1 nanometer and approximately 10 micrometers. In some embodiments, the first through sixth lengths $L_1$-$L_6$ are each in a range of between, for example, approximately 1 nanometer and approximately 1000 micrometers.

In some embodiments, the second width $w_2$ of the first segment 122a increases in value as the second width $w_2$ is measured from left to right according to the top-view 300A. In some embodiments, third segment 122c of the first tapered phase matching portion 122 is arranged between the first and second segments 122a, 122b. In some embodiments, the third width $w_3$ of the second segment 122b decreases in value as the third width $w_3$ is measured from left to right according to the top-view 300A. In some embodiments, the sixth width $w_6$ of the fourth segment 124a increases in value as the sixth width $w_6$ is measured from left to right according to the top-view 300A. In some embodiments, the fifth segment 124b of the second tapered phase matching portion 124 is arranged between the fourth and sixth segments 124a, 124c. In some embodiments, the seventh width $w_7$ of the fifth segment 124b decreases in value as the seventh width $w_7$ is measured from left to right according to the top-view 300A.

In some embodiments, the first tapered phase matching portion 122 is not symmetric with the second tapered phase matching portion 124 along the x-axis. In some embodiments, for example, the third segment 122c of the first tapered phase matching portion 122, which has a constant fourth width $w_4$, is arranged directly above the fifth segment 124b of the second tapered phase matching portion 124, which has a variable seventh width $w_7$. In some embodiments, the asymmetry of the first and second tapered phase matching portions 122, 124 allows the first and second tapered phase matching portions 122, 124 to be arranged closer to one another such that device density does not decrease. For example, a maximum value of the third width $w_3$ of the second segment 122b of the first tapered phase matching portion 122 can be increased because the second segments 122b of the first tapered phase matching portion 122 is arranged directly over the sixth segment 124c of the second tapered phase matching portion 124, which has an eighth width $w_8$ that is less than a maximum value of the third width $w_3$. Thus, there is more space for design variations between the second segment 122b of the first tapered phase matching portion 122 and the sixth segment 124c of the second tapered phase matching portion 124 (e.g., an asymmetric arrangement) than if the second segment 122b of the first tapered phase matching portion 122 were arranged directly above the fifth segment 124b of the second tapered phase matching portion 124 (e.g., a symmetric arrangement).

It will be appreciated that the degree of asymmetry of the first and second tapered phase matching portions 122, 124; the length of the first and second tapered phase matching portions 122, 124; and the amount of width variations of the first and second tapered phase matching portions 122, 124 may be adjusted to change the effective index $n_{eff}$ to ultimately create a waveguide structure (104 of FIG. 1) having a substantially frequency- and process-insensitive the coupling ratio.

Figure 3B:
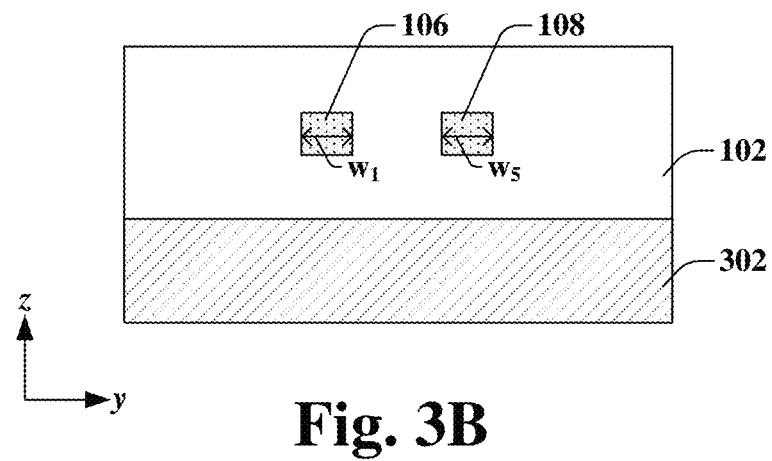

FIG. 3B illustrates a cross-sectional view 300B of some embodiments of the first and second waveguide 106, 108 corresponding to cross-section line BB' of FIG. 3A. Thus, in some embodiments, the top-view 300A of FIG. 3A is on an xy-plane, whereas the cross-sectional view 300B of FIG. 3B is on the yz-plane.

In some embodiments, the dielectric structure 102 completely surrounds the first and second waveguides 106, 108. In some embodiments, the first waveguide 106 is completely spaced apart from the second waveguide 108 in the y-direction by the dielectric structure 102. In some embodiments, from the cross-sectional view 300B of FIG. 3B, the first width $w_1$ of the first waveguide 106 is about equal to the fifth width $w_5$ of the second waveguide 108. In some embodiments, due to manufacturing variations, the first width $w_1$ of the first waveguide 106 is not equal to the fifth width $w_5$ of the second waveguide 108. However, the first and second tapered phase matching portions (122, 124 of FIG. 3A) are configured to adjust light traveling through the first and second waveguides 106, 108 to compensate for any change to the coupling ratio influenced by unintentional manufacturing variations such that the coupling ratio of the overall waveguide structure (104 of FIG. 1) is insensitive to such manufacturing variations.

It will be appreciated that in the top-view 300A of FIG. 3A, top-most surfaces of the first and second waveguides 106, 108 are not covered by the dielectric structure 102 for ease of understanding and visualization of the first and second waveguides 106, 108. However, FIG. 3B shows that the top-most surfaces of the first and second waveguides 106, 108 are in fact covered by the dielectric structure 102. In some embodiments, the dielectric structure 102 is arranged over a base substrate 302. In some embodiments, the base substrate 302 comprises a semiconductor material such as, for example, silicon, germanium, or the like. In some other embodiments, the base substrate 302 comprises a transparent material or at least translucent material such that light may travel through the base substrate 302.

Figure 3C:
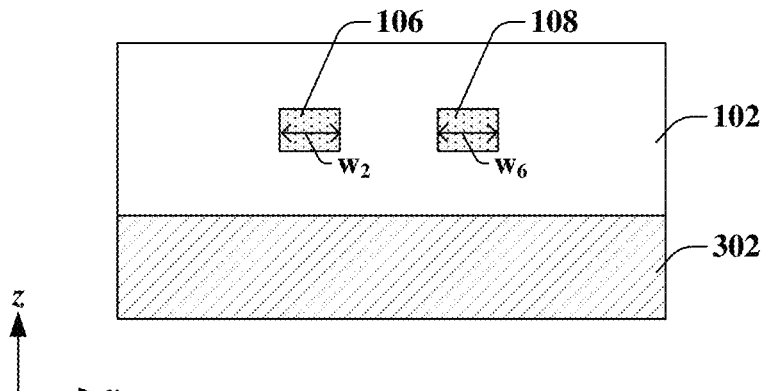

FIG. 3C illustrates a cross-sectional view 300C of some embodiments of the first and second waveguide 106, 108 corresponding to cross-section line CC' of FIG. 3A. Thus, in some embodiments, the top-view 300A of FIG. 3A is on an xy-plane, whereas the cross-sectional view 300C of FIG. 3C is on the yz-plane.

The cross-section line CC' of FIG. 3A extends through the first segment (122a of FIG. 3A) of the first tapered phase matching portion (122 of FIG. 3A) and the fourth segment (124a of FIG. 3A) of the second tapered phase matching portion (124 of FIG. 3A). Thus, in some embodiments, the first waveguide 106 has the second width $w_2$ and the second waveguide 108 has the sixth width $w_6$ in FIG. 3C. In some embodiments, because the cross-section line CC' of FIG. 3A extends through portions of the first and second waveguides 106, 108 that increase in width through the length, then the second width $w_2$ of FIG. 3C is greater than the first width $w_1$ of FIG. 3B and the sixth width $w_6$ of FIG. 3C is greater than the fifth width $w_5$ of FIG. 3C. In some embodiments, the first segment (122a of FIG. 3A) of the first tapered phase matching portion (122 of FIG. 3A) and the fourth segment (124a of FIG. 3A) of the second tapered phase matching portion (124 of FIG. 3A) are symmetric over the x-axis, and thus, the second width $w_2$ is about equal to the sixth width $w_6$. In some other embodiments, the second width $w_2$ is not equal to the sixth width $w_6$.

Figure 3D:
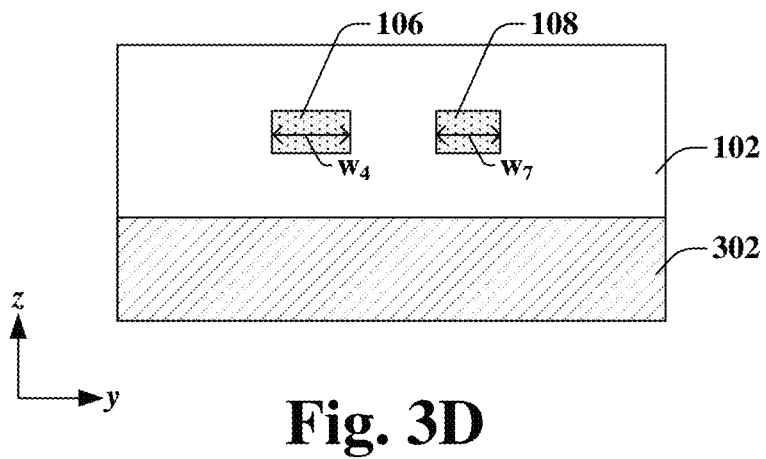

FIG. 3D illustrates a cross-sectional view 300D of some embodiments of the first and second waveguide 106, 108 corresponding to cross-section line DD' of FIG. 3A. Thus, in some embodiments, the top-view 300A of FIG. 3A is on an xy-plane, whereas the cross-sectional view 300D of FIG. 3D is on the yz-plane.

The cross-section line DD' of FIG. 3A extends through the third segment (122c of FIG. 3A) of the first tapered phase matching portion (122 of FIG. 3A) and the fifth segment (124b of FIG. 3A) of the second tapered phase matching portion (124 of FIG. 3A). Thus, in some embodiments, the first waveguide 106 has the fourth width $w_4$ and the second waveguide 108 has the seventh width $w_7$ in FIG. 3D. In some embodiments, because the third segment (122c of FIG. 3A) of the first tapered phase matching portion (122 of FIG. 3A) is asymmetric with the fifth segment (124b of FIG. 3A) of the second tapered phase matching portion (124 of FIG. 3A) over the x-axis as seen in FIG. 3A, the fourth width $w_4$ is different than the seventh width $w_7$ in some embodiments. In other embodiments, the fourth width $w_4$ may be about equal with the seventh width $w_7$.

Figure 3E:
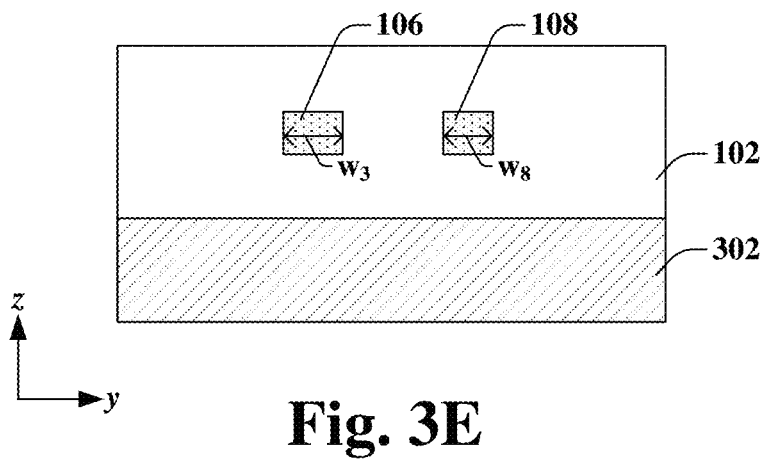

FIG. 3E illustrates a cross-sectional view 300E of some embodiments of the first and second waveguide 106, 108 corresponding to cross-section line EE' of FIG. 3A. Thus, in some embodiments, the top-view 300A of FIG. 3A is on an xy-plane, whereas the cross-sectional view 300E of FIG. 3E is on the yz-plane.

The cross-section line EE' of FIG. 3A extends through the second segment (122b of FIG. 3A) of the first tapered phase matching portion (122 of FIG. 3A) and the sixth segment (124c of FIG. 3A) of the second tapered phase matching portion (124 of FIG. 3A). Thus, in some embodiments, the first waveguide 106 has the third width $w_3$ and the second waveguide 108 has the eighth width $w_8$ in FIG. 3D. In some embodiments, because the second segment (122b of FIG. 3A) of the first tapered phase matching portion (122 of FIG. 3A) is asymmetric with the sixth segment (124c of FIG. 3A) of the second tapered phase matching portion (124 of FIG. 3A) over the x-axis as seen in FIG. 3A, the third width $w_3$ is different than the eighth width $w_8$ in some embodiments. In other embodiments, the third width $w_3$ may be about equal with the eighth width $w_8$.

Figure 4:
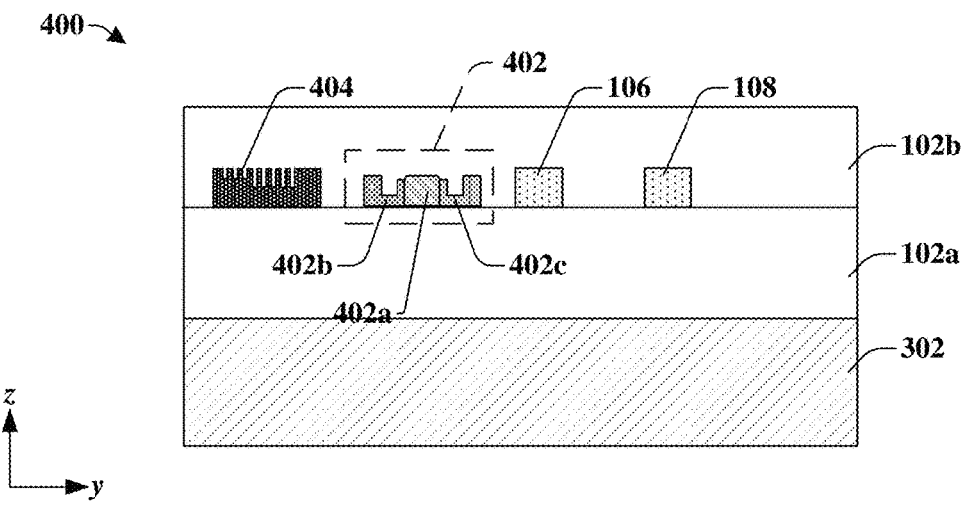

FIG. 4 illustrates a cross-sectional view 400 of some embodiments of first and second waveguides being arranged nearby other optical devices.

In some embodiments, the first and second waveguides 106, 108, as well as other optical devices, are arranged over a first dielectric layer 102a, and a second dielectric layer 102b laterally surrounds and overlies the first and second waveguides 106, 108. For example, in some embodiments, the optical devices may include a photodiode 402, a grating structure 404, and/or some other optical devices. In some embodiments, the grating structure 404 may be coupled to a light source and guide light from the light source into one or more of the optical devices (e.g., the photodiode 402, the first waveguide 106, the second waveguide 108, etc.).

The photodiode 402 may be configured to receive light from the grating structure 404 and/or the first and second waveguides 106, 108 and transmit the light into a digital signal. Thus, in some embodiments, one or more photodiodes 402 may be coupled to the first and/or second waveguides 106, 108. The photodiode 402 may comprise, for example, a first doped region 402b, a second doped region 402c, and an undoped region 402a arranged between the first and second doped regions 402b, 402c. In some embodiments, the first doped region 402b has a first doping type (e.g., n-type, p-type), whereas the second doped region 402c has a second doping type (e.g., p-type, n-type).

Figure 5:
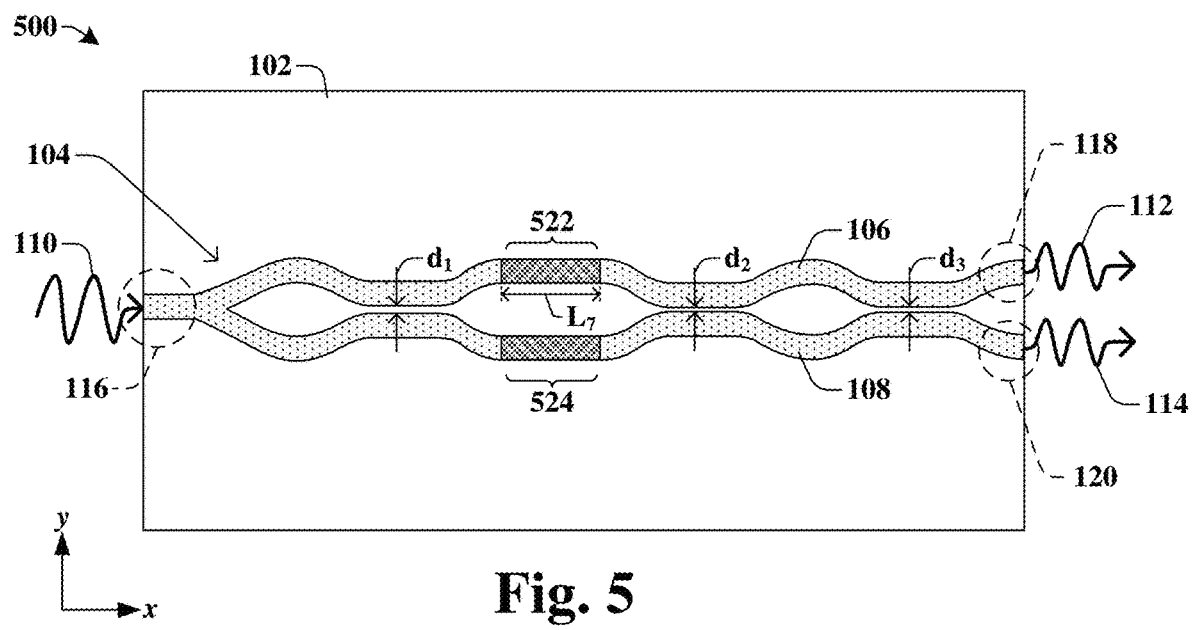
FIG. 5 illustrates a top-view of some embodiments of an optical device comprising a first waveguide optically coupled to a second waveguide, wherein the first and second waveguide each comprise portions with a different material than surrounding portions of the first and second waveguides to stabilize a coupling ratio of the first and second waveguides.

FIG. 5 illustrates a top-view 500 of some other embodiments of a waveguide structure of a multi-stage directional coupler having extrinsic material portions to achieve phase matching.

The first waveguide 106 of FIG. 5 comprises a first extrinsic phase matching portion 522, and the second waveguide 108 of FIG. 5 comprises a second extrinsic phase matching portion 524 arranged below the first extrinsic phase matching portion 522 in the y-direction. In some such embodiments, the first extrinsic phase matching portion 522 comprises a material that is different than the material of the remaining portions of the first waveguide 106, and the second extrinsic phase matching portion 524 comprises a material that is different than the material of the remaining portions of the second waveguide 108. In some embodiments, the material of the first extrinsic phase matching portion 522 is the same as the material of the second extrinsic phase matching portion 524. In some other embodiments, the material of the first extrinsic phase matching portion 522 is different than the material of the second extrinsic phase matching portion 524.

In some embodiments, the materials of the first and second extrinsic phase matching portions 522, 524 may comprise, for example, III-V materials, metals, dielectric materials, polymers, or some other suitable material that is capable of transporting light. In some embodiments, if the material of the first and second extrinsic phase matching portions 522, 524 comprises a III-V material, then the refractive index of the III-V material is in a range of between, for example, approximately 3 and approximately 4. In some embodiments, if the material of the first and second extrinsic phase matching portions 522, 524 comprises a polymeric material, then the refractive index of the polymeric material is in a range of between, for example, approximately 1.5 and approximately 2. In some embodiments, the first and second extrinsic phase matching portions 522, 524 each have a length measured in the x-direction about equal to a seventh length $L_7$. In some embodiments, the seventh length $L_7$ is in a range of between, for example, approximately 1 micrometer and approximately 100 micrometers.

In some such embodiments, adding the first and second extrinsic phase matching portions 522, 524 to the waveguide structure 104 changes the refractive index (e.g., $n_{eff}$) of the waveguide structure 104 at the first and second extrinsic phase matching portions 522, 524, which changes the wave number β and thus, phase of light traveling through the waveguide structure 104. As such, phase matching may be achieved to reduce variation of the coupling ratio and improve the reliability of the overall device.

Figure 6:
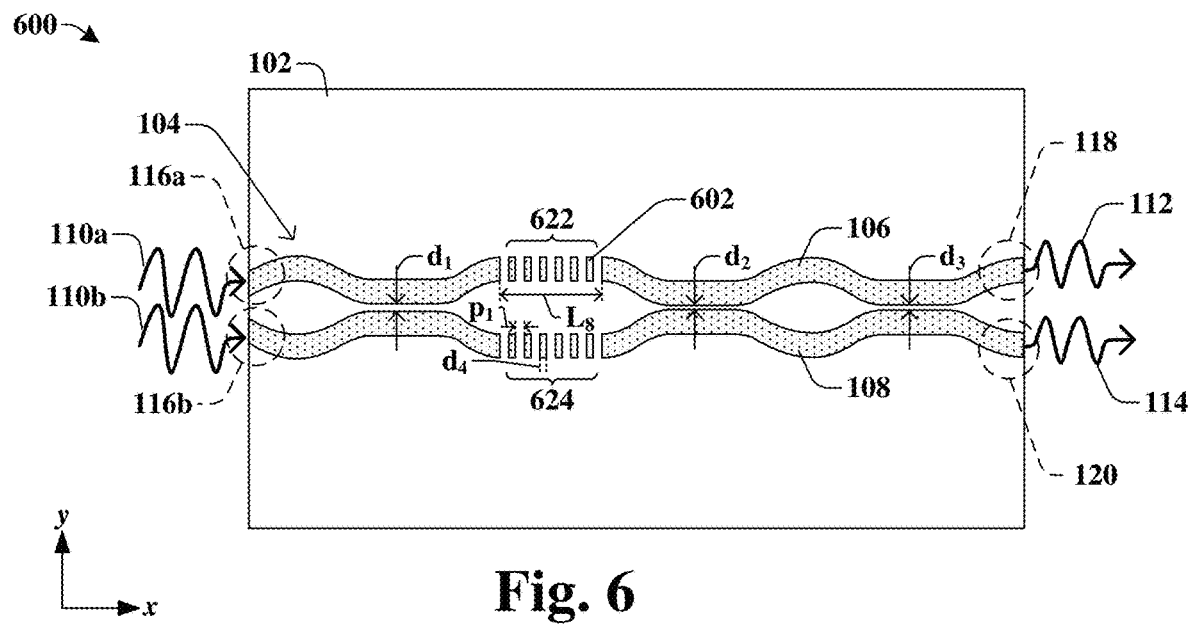
FIG. 6 illustrates a top-view of some embodiments of an optical device comprising a first waveguide optically coupled to a second waveguide, wherein the first and second waveguide each comprise portions with multiple sub-segments of the waveguide material to stabilize a coupling ratio of the first and second waveguides.

FIG. 6 illustrates a top-view 600 of some other embodiments of a waveguide structure of a multi-stage directional coupler having subwavelength portions to achieve phase matching.

The first waveguide 106 of FIG. 6 includes a first subwavelength phase matching portion 622, and the second waveguide 108 of FIG. 6 includes a second subwavelength phase matching portion 624 arranged below the first subwavelength phase matching portion 622 in the y-direction. In some embodiments, the first and second subwavelength phase matching portions 622, 624 comprise a same material as the other portions of the first and second waveguides 106, 108. In some other embodiments, the first and second subwavelength phase matching portions 622, 624 comprise a different material than the other portions of the first and second waveguides 106, 108.

The first and second subwavelength phase matching portions 622, 624 each comprise multiple sub-segments 602 spaced apart from one another by a pitch value pi. The sub-segments 602 are spaced apart from one another in the x-direction by the dielectric structure 102. In some embodiments, the first and second subwavelength phase matching portions 622, 624 each have a same number of sub-segments 602, whereas in other embodiments, the first and second subwavelength phase matching portions 622, 624 have a different number of sub-segments 602. Thus, in some embodiments, the pitch value pi of the first subwavelength phase matching portion 622 is different than the pitch value pi of the second subwavelength phase matching portion 624. In some embodiments, the first pitch pi is in a range of between, for example, approximately 0.1 micrometer and approximately 1 micrometer.

In some embodiments, the sub-segments 602 each have a length equal to a fourth distance $d_4$ that is in a range of between, for example, approximately 1 nanometer and approximately 500 micrometers. In some embodiments, the first and second subwavelength phase matching portions 622, 624 each have an eighth length $L_8$ measured in the x-direction in a range of between, for example, approximately 0.1 micrometers and approximately 1000 micrometers. In some embodiments, the eighth lengths $L_8$ of the first and second subwavelength phase matching portions 622, 624 are equal to one another to minimize the device footprint. In some embodiments, the first and second subwavelength phase matching portions 622, 624 of the first and second waveguides 106, 108 can change the refractive index (e.g., $n_{eff}$) of the waveguide structure 104 at the first and second subwavelength phase matching portions 622, 624, which changes the wave number β and thus, phase of light traveling through the waveguide structure 104. As such, phase matching may be achieved to reduce variation of the coupling ratio and improve the reliability of the overall device.

Further, instead of a single input terminal (e.g., 110 of FIG. 1), the waveguide structure 104 of FIG. 6 shows that in some other embodiments, a first impingent light 110a may enter a first input terminal 116a of the first waveguide 106, whereas a second impingent light 110b may enter a second input terminal 116b of the second waveguide 106. In some such embodiments, the impingent light (110a, 110b) entering the first and second input terminals 116a, 116b is optically coupled at least at the linear portions of the first and second waveguides 106, 108 for recombination and/or splitting.

Figure 7:
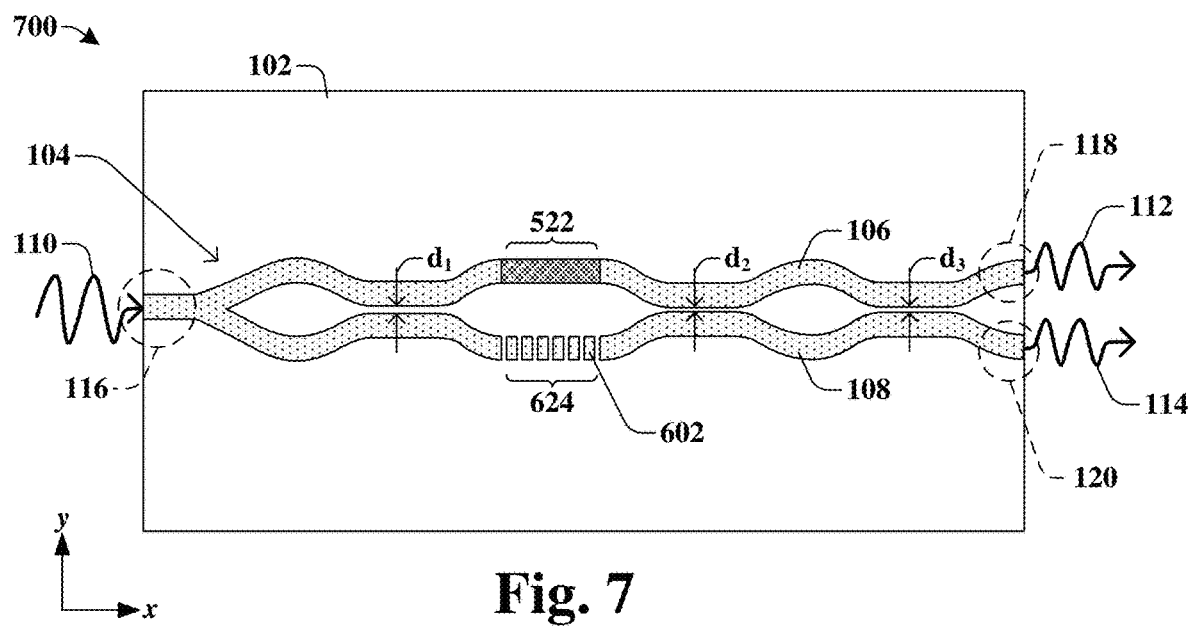
FIGS. 7-9 illustrate top-views of some other embodiments of the first and second waveguides comprising phase matching portions that have different structures from one another as well as from surrounding portions of the first and second waveguides to stabilize a coupling ratio of the first and second waveguides.
Figure 8:
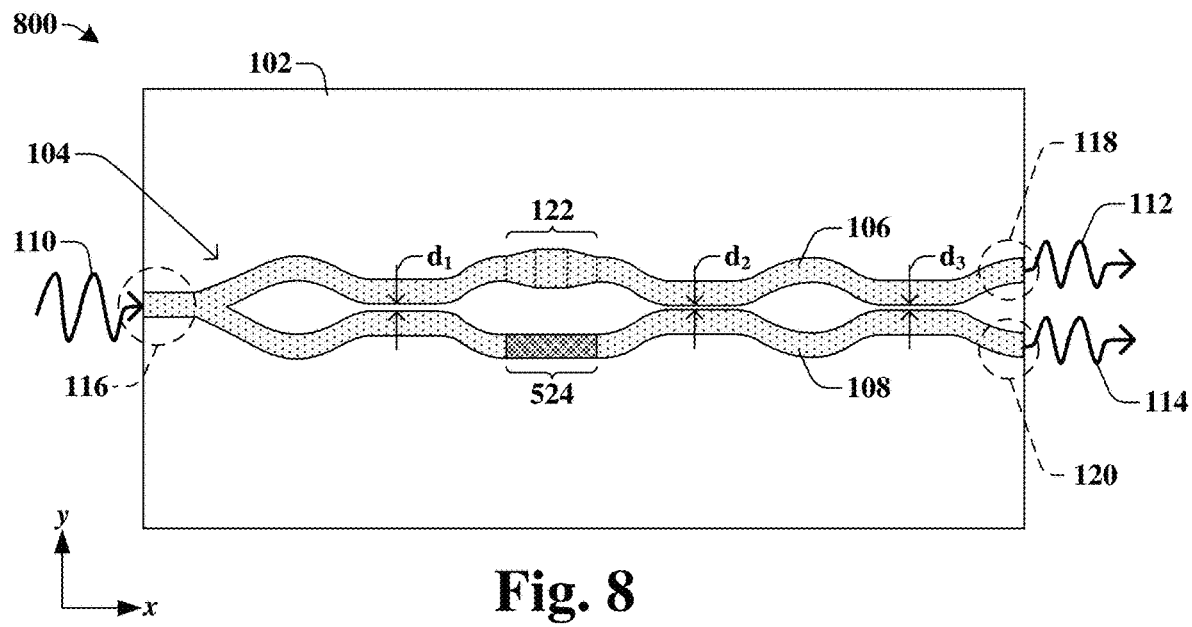
Figure 9:
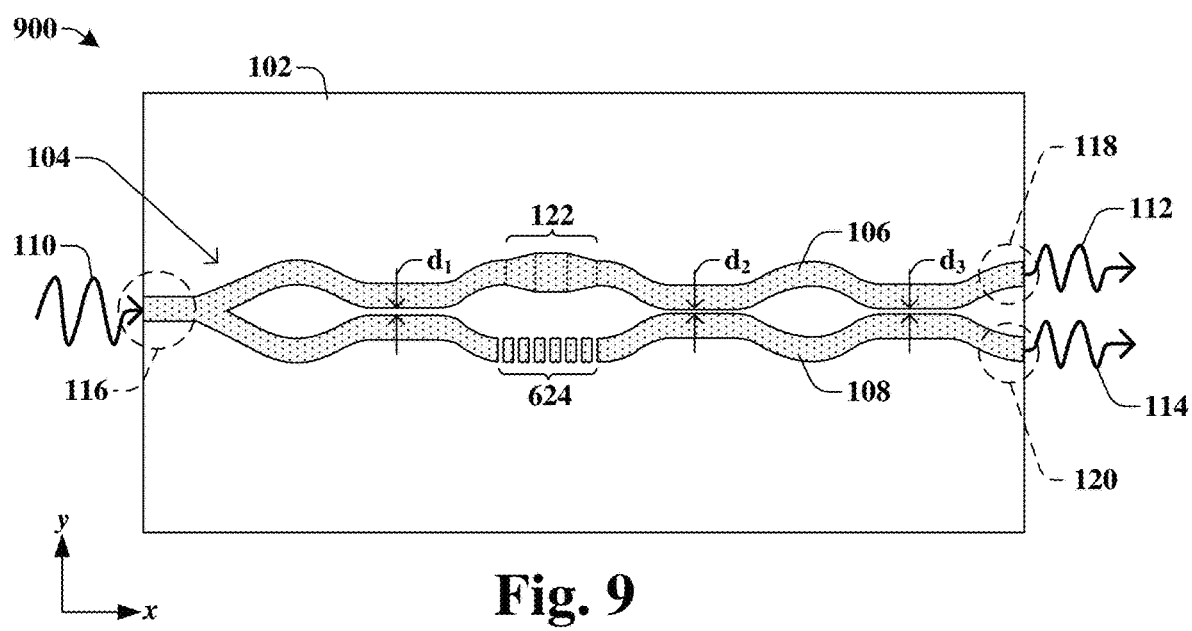

FIGS. 7, 8, and 9 illustrate other various embodiments of a waveguide structure 104 that utilizes a combination of the phase matching mechanisms presented in FIGS. 1, 5, and 6 in order to achieve phase matching to achieve a frequency- and process-insensitive coupling ratio.

As shown in cross-sectional view 700 of FIG. 7, in some embodiments, the first waveguide 106 comprises the first extrinsic phase matching portion 522, and the second waveguide 108 comprises the second subwavelength phase matching portion 624 directly below the first extrinsic phase matching portion 522 in the y-direction. In some such embodiments, the first extrinsic phase matching portion 522 may have about a same length measured in the x-direction as the second subwavelength phase matching portion 624. In some such embodiments, the extrinsic material used in the first extrinsic phase matching portion 522, the length of the first and second phase matching portions (522, 624), and the pitch and width of the sub-segments 602 of the second subwavelength phase matching portion 624 are designed to achieve a waveguide structure 104 having a frequency- and process-insensitive coupling ratio.

As shown in cross-sectional view 800 of FIG. 8, in some embodiments, the first waveguide 106 comprises the first tapered phase matching portion 122, and the second waveguide 108 comprises the second extrinsic phase matching portion 524 directly below the first tapered phase matching portion 122 in the y-direction. In some such embodiments, the first tapered phase matching portion 122 may have about a same length measured in the x-direction as the second extrinsic phase matching portion 524. In some such embodiments, the extrinsic material used in the second extrinsic phase matching portion 524, the length of the first and second phase matching portions (122, 524), and the width variation of the first tapered phase matching portion 122 are designed to achieve a waveguide structure 104 having a frequency- and process-insensitive coupling ratio.

As shown in cross-sectional view 900 of FIG. 9, in some embodiments, the first waveguide 106 comprises the first tapered phase matching portion, and the second waveguide 108 comprises the second subwavelength phase matching portion 624 directly below the first tapered phase matching portion 122 in the y-direction. In some such embodiments, the first tapered phase matching portion 122 may have about a same length measured in the x-direction as the second subwavelength phase matching portion 624. In some such embodiments, the width variation of the first tapered phase matching portion 122, the length of the first and second phase matching portions (122, 624), and the pitch and width of the sub-segments 602 of the second subwavelength phase matching portion 624 are designed to achieve a waveguide structure 104 having a frequency- and process-insensitive coupling ratio.

FIGS. 10-17B illustrate various views 1000-1700B of some embodiments of a method of forming a waveguide structure configured to split impingent light according to a coupling ratio that is substantially insensitive to frequency and/or manufacturing variations. Although FIGS. 10-17B are described in relation to a method, it will be appreciated that the structures disclosed in FIGS. 10-17B are not limited to such a method, but instead may stand alone as structures independent of the method.

Figure 10:
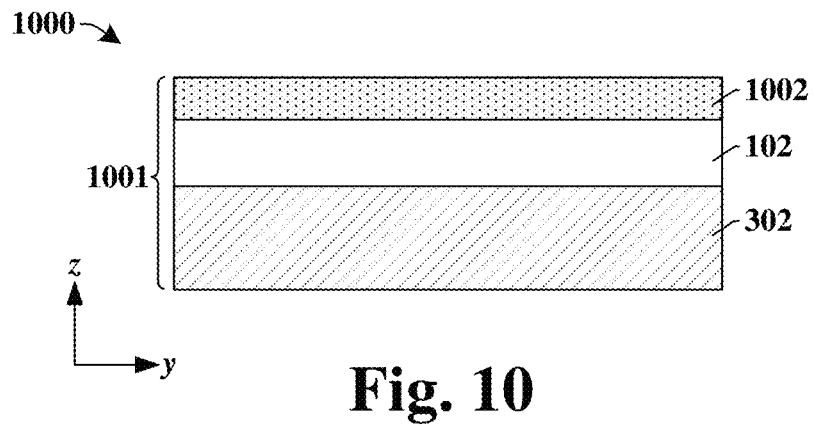
FIGS. 10-17B illustrate various views of some embodiments of a method of forming a first and second waveguide optically coupled to one another and comprising phase matching portions to improve the stability of the first and second waveguides.

As shown in cross-sectional view 1000 of FIG. 10, a silicon-on-insulator (SOI) substrate 1001 is provided. The SOI substrate 1001 may comprise a base substrate 302, a dielectric structure 102 arranged over the base substrate 302, and an active layer 1002 arranged over the dielectric structure 102. In some embodiments, the base substrate 302 may comprise a crystalline semiconductor material (e.g., silicon, germanium, etc.). In some embodiments, the base substrate 302 is a transparent and/or translucent material such that light may travel through the base substrate 302 in optical applications. In some embodiments, the active layer 1002 may also comprise a semiconductor material such as, for example, silicon, germanium, or the like. In some embodiments, the dielectric structure 102 comprises, for example, a bulk oxide, such as silicon dioxide. In some other embodiments, the dielectric structure 102 may comprise, for example, a nitride, a carbide, or some other dielectric material. In some embodiments, the SOI substrate 1001 may be formed by way of various deposition and/or bonding processes. In some other embodiments, instead of the SOI substrate 1001, the method begins with a light-transport layer arranged over the base substrate 302. In some embodiments, the light-transport layer comprises silicon oxide, silicon nitride, or some other suitable material that transports light, and the base substrate 302 may be or comprise some other type of semiconductor body (e.g., silicon/CMOS bulk, SiGe, etc.).

Figure 11A:
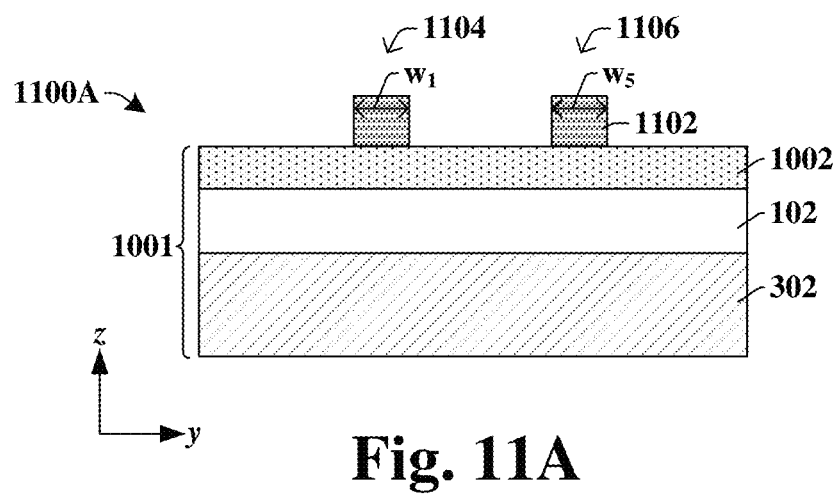

As shown in cross-sectional view 1100A of FIG. 11A, a first masking structure 1102 is formed over the active layer 1002 of the SOI substrate 1001. From the cross-sectional view 1100A of FIG. 11A, the first masking structure 1102 may comprise a first portion 1104 and a second portion 1106 spaced apart from the first portion 1104. In some embodiments, the first portion 1104 of the first masking structure 1102 has a first width $w_1$, and the second portion 1106 of the first masking structure 1102 has a fifth width $w_5$ from the cross-sectional view 1100A. In some embodiments, each of the first widths $w_1$ and the fifth width $w_5$ is in range of between, for example, approximately 1 nanometer and approximately 10 micrometers. In some embodiments, the first width $w_1$ is equal to the fifth width $w_5$. In some other embodiments, due to process variations, the first width $w_1$ is not equal to the fifth width $w_5$. The first masking structure 1102 may be formed using photolithography and removal (e.g., etching) processes. In some embodiments, the first masking structure 1102 comprises a photoresist material or a hard mask material.

FIGS. 11B-11E illustrate top-views 1100B-1100E of various embodiments of the first masking structure 1102 arranged over the active layer 1002 of the SOI substrate 1001. The variation in design of the first masking structure 1102 illustrated in FIGS. 11B-11E may be determined based on a desired coupling ratio to split light in the final device. Further, cross-section line AA' of FIGS. 11B-11E may correspond to the cross-sectional view 1100A of FIG. 11A.

Figure 11B:
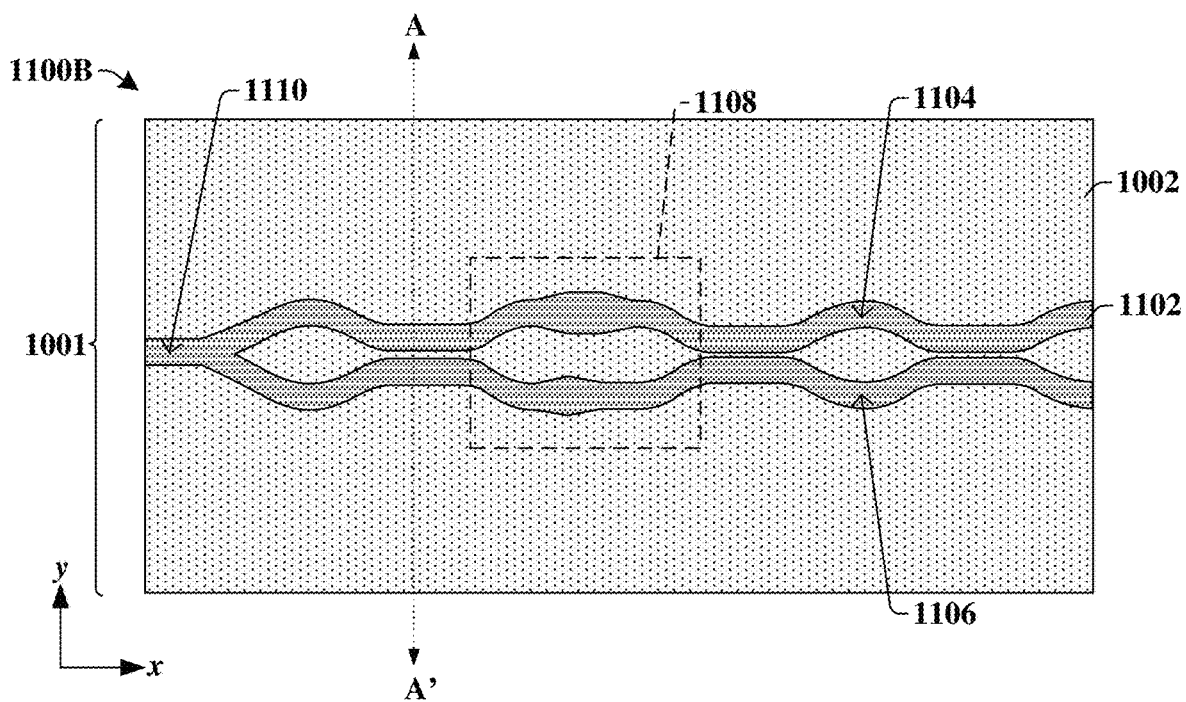

As shown in the top-view 1100B of FIG. 11B, a distance between the first portion 1104 of the first masking structure 1102 and the second portion 1106 of the first masking structure 1102 in the y-direction increases and decreases throughout the length of the first masking structure 1102 in the x-direction. In some embodiments, the first and second portions 1104, 1106 of the first masking structure 1102 contact one another at an input portion 1110 of the first masking structure 1102. Further, in some embodiments, the first masking structure 1102 comprises a varying width portion 1108, wherein a width of each of the first and second portions 1104, 1106 of the first masking structure 1102 measured in the y-direction varies throughout the x-direction.

Figure 11C:
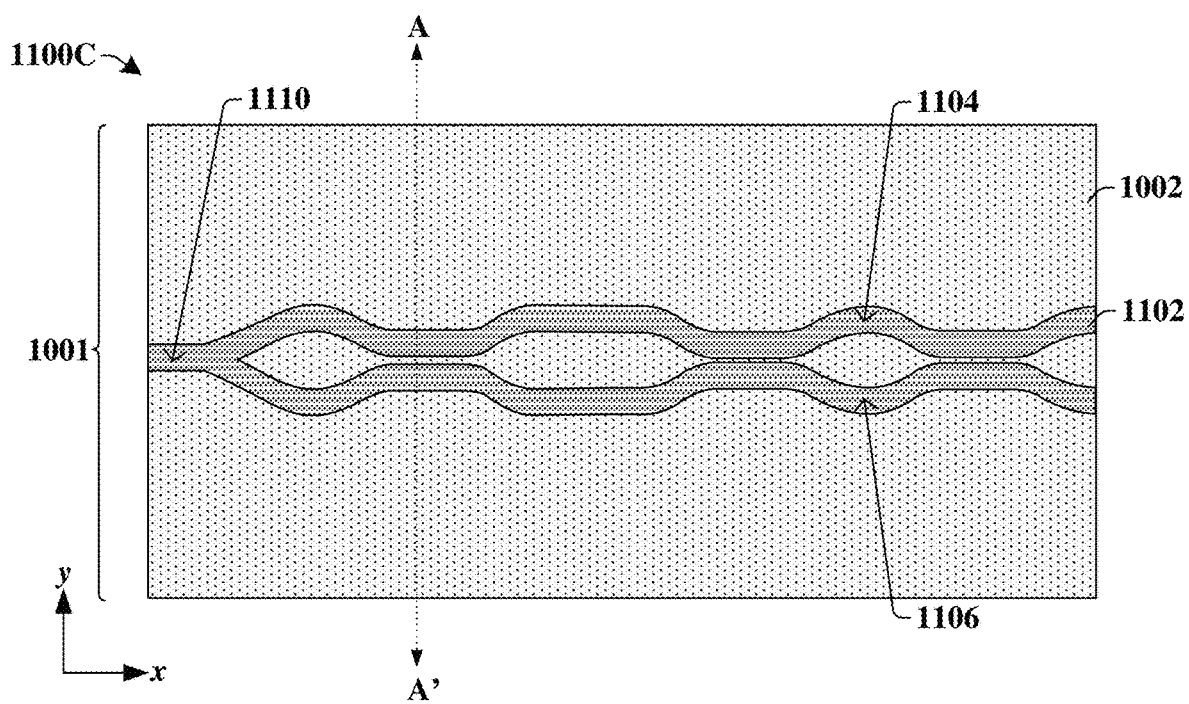

As shown in the top-view 1100C of FIG. 11C, in some other embodiments, there is not varying width portion (1108 of FIG. 11B) of the first waveguide structure 106. In some such other embodiments, the first and second portions 1104, 1106 of the first masking structure 1102 have a substantially constant width as the width is measured in the y-direction.

Figure 11D:
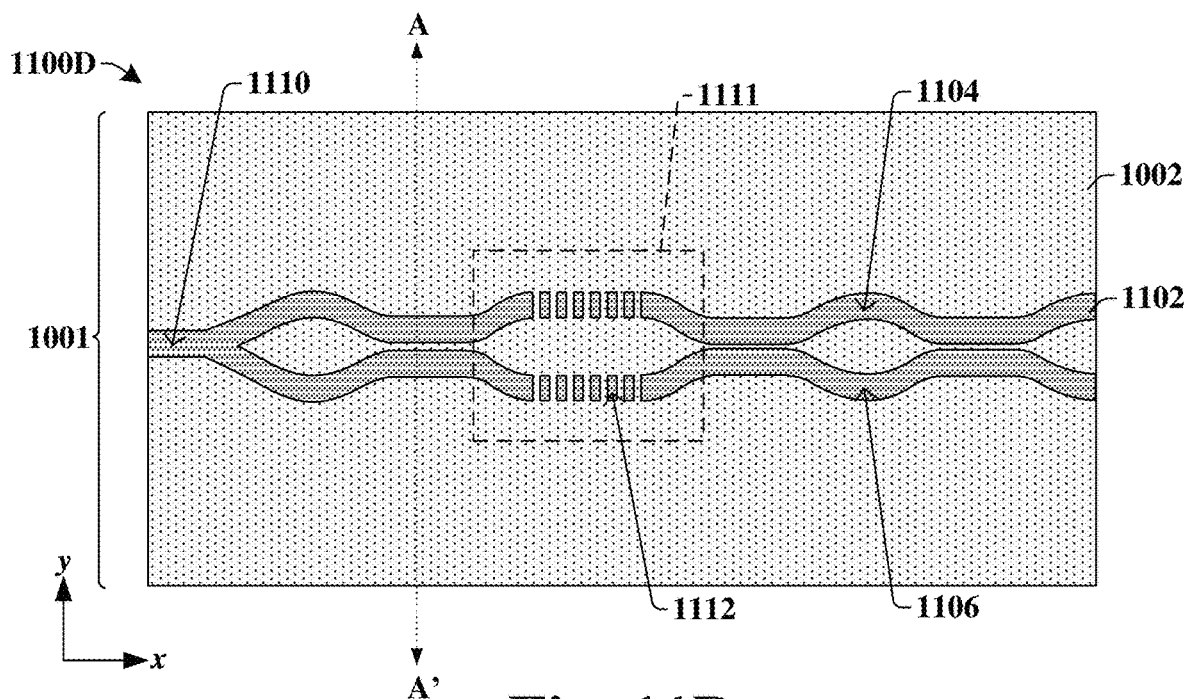
Figure 11E:
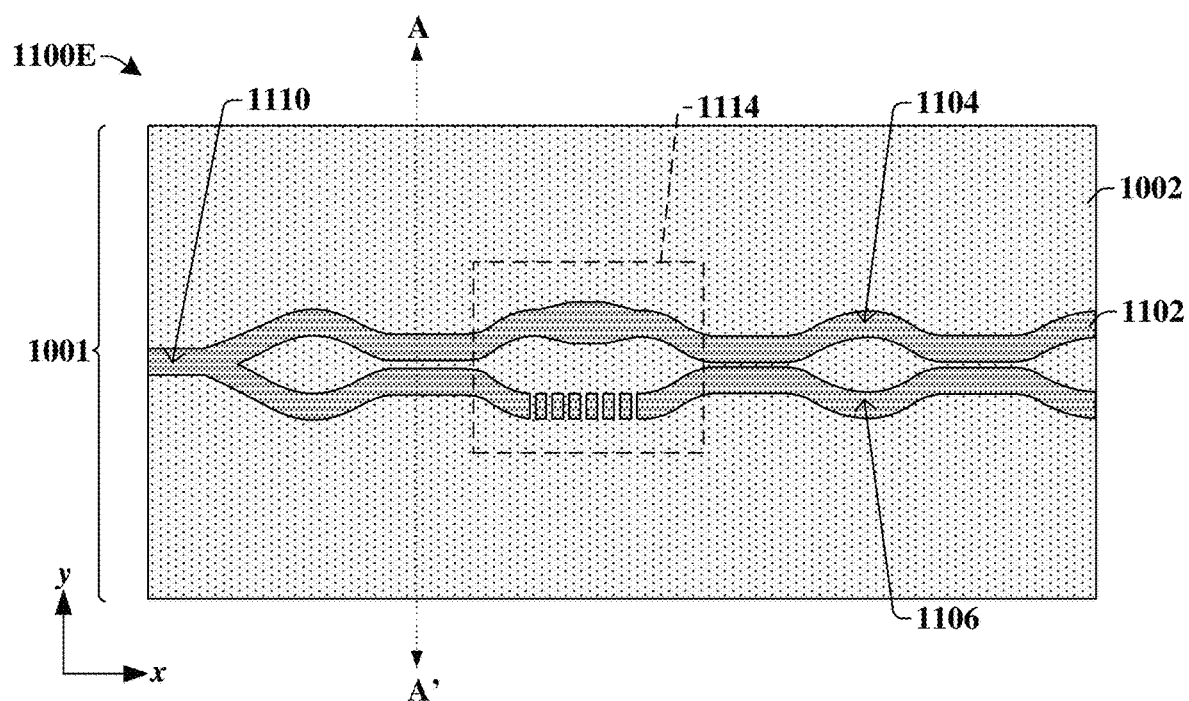

As shown in the top-view 1100D of FIG. 11D, in some other embodiments, the first masking structure 1102 comprises a sub-wavelength portion 1111, wherein the first and second portions 1104, 1106 of the first masking structure 1102 comprise multiple sub-segments 1112 spaced apart from one another in the x-direction. In some embodiments, the multiple sub-segments 1112 each have a certain width measured in the x-direction and are spaced apart from one another by a certain pitch. (e.g., see, FIG. 6).

As shown in top-view 1100E, in yet some other embodiments, the first masking structure 1102 comprises a mixed variation portion 1114, wherein the first portion 1104 of the first masking structure 1102 has a varying width similar to the varying width portion 1108 of FIG. 11B, and wherein the second portion 1106 has a sub-wavelength structure similar to the sub-wavelength portion 1111 of FIG. 11D. In other words, in some embodiments, the first masking structure 1102 mixes the various structures of the first and second portions 1104, 1106 of the first masking structure 1102 described in FIGS. 11B-11D.

Figure 12:
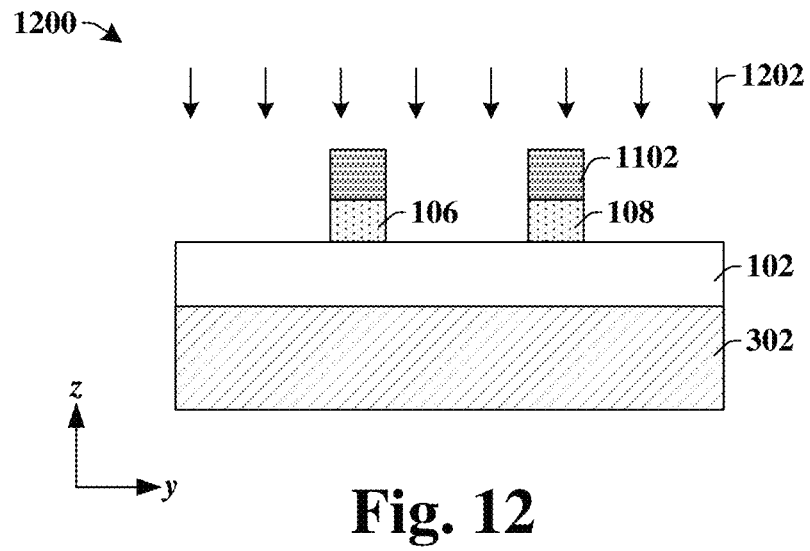

As shown in cross-sectional view 1200 of FIG. 12, a first removal process 1202 is performed to remove portions of the active layer (1002 of FIG. 11A) according to the first masking structure 1102 to form a first waveguide 106 arranged beside a second waveguide 108. In some embodiments, the first removal process 1202 is a wet or dry etching process. In some embodiments, the dielectric structure 102 is substantially resistant to removal by the first removal process 1202.

Figure 13A:
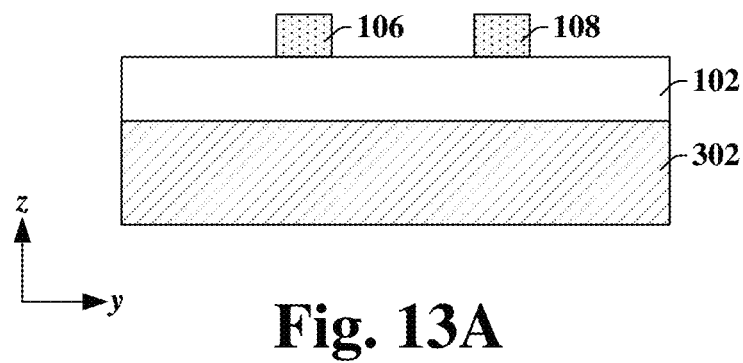

As shown in cross-sectional view 1300A of FIG. 13A, in some embodiments, the first masking structure 1102 of FIG. 12 is removed. In some embodiments, the first masking structure (1102 of FIG. 12) is removed by an etching process, a planarization process, or some other suitable removal process.

FIGS. 13B-13E illustrate top-views 1300B-1300E of various embodiments of the first and second waveguides 106, 108 formed in the dielectric structure 102 after the first removal process 1202 of FIG. 12. In such embodiments, the method may proceed from FIG. 10 to FIG. 11B to FIG. 12 to FIG. 12B; from FIG. 10 to FIG. 11C to FIG. 12 to FIG. 13C; from FIG. 10 to FIG. 11D to FIG. 12 to FIG. 13D; or from FIG. 10 to FIG. 11E to FIG. 12 to FIG. 13E. Further, cross-section line AA' of FIGS. 13B-13E may correspond to the cross-sectional view 1300A of FIG. 13A.

Figure 13B:
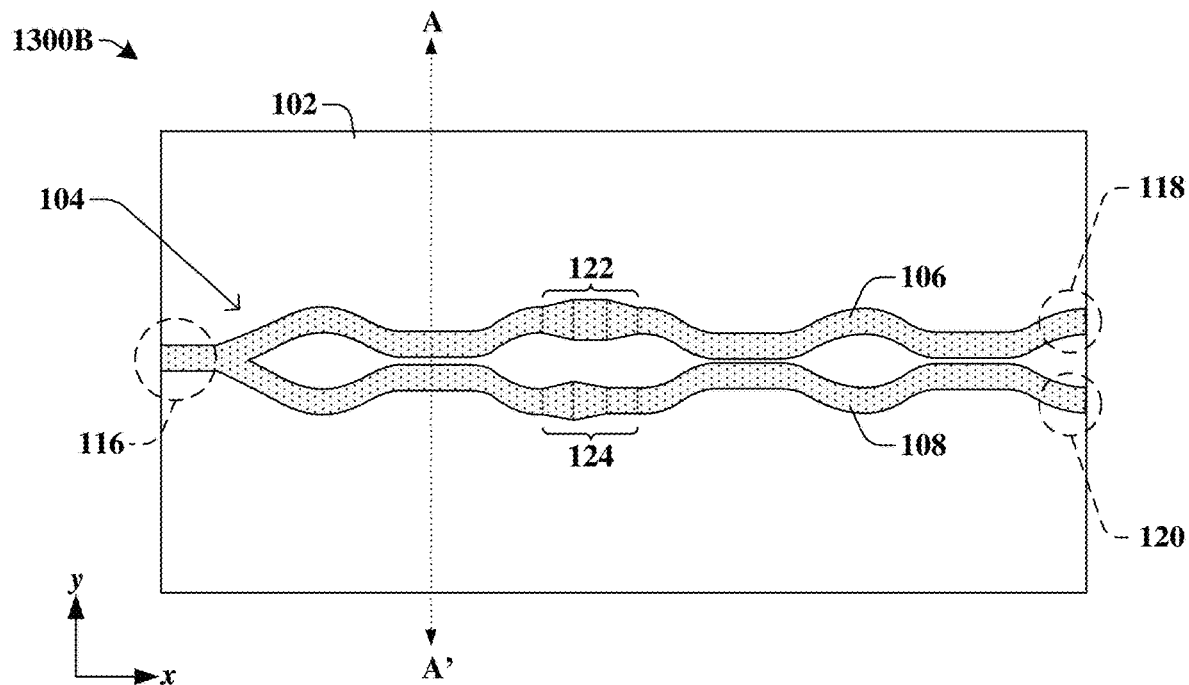

As shown in cross-sectional view 1300B of FIG. 13B, in some embodiments, a waveguide structure 104 comprises the first and second waveguides 106, 108. The first and second waveguides 106, 108 may couple at an input terminal 116 configured to receive impingent light. The first waveguide 106 is coupled to a first output terminal 118, and the second waveguide 108 is coupled to a second output terminal 120. In some embodiments, the first waveguide 106 comprises a first tapered phase matching portion 122, and the second waveguide 108 comprises a second tapered phase matching portion 124. Because the varying widths of the first and second tapered phase matching portions 122, 124 change the effective index of the waveguide structure 104, the phase difference of light traveling from the input terminal 116 to the first and second output terminals 118, 120 is adjusted in the first and second tapered phase matching portions 122, 124 to achieve a desired coupling ratio that is not substantially dependent on frequency or process variations. Further details regarding the first and second tapered phase matching portions 122, 124 may be found at least in the description of FIG. 3A of the present disclosure.

Figure 13C:
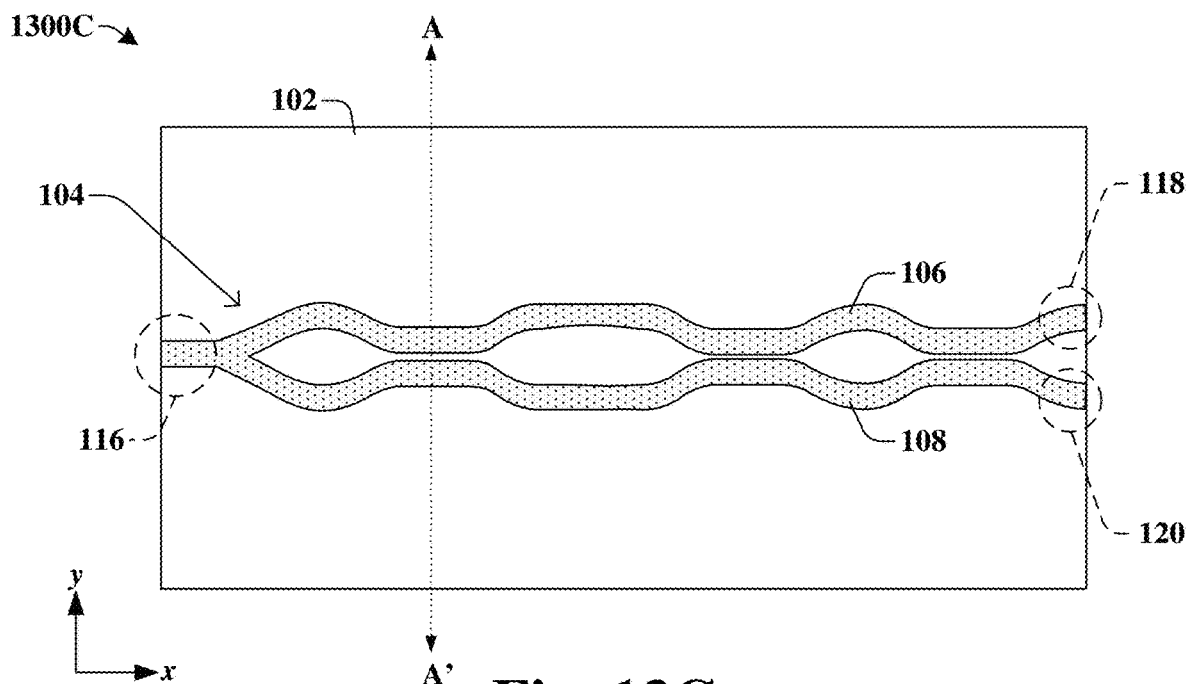

As shown in cross-sectional view 1300C of FIG. 13C, in some other embodiments, the first and second waveguides 106, 108 comprise a same material, have a continuous structure, and have substantially constant widths throughout their length after the first removal process (1202 of FIG. 12).

Figure 13D:
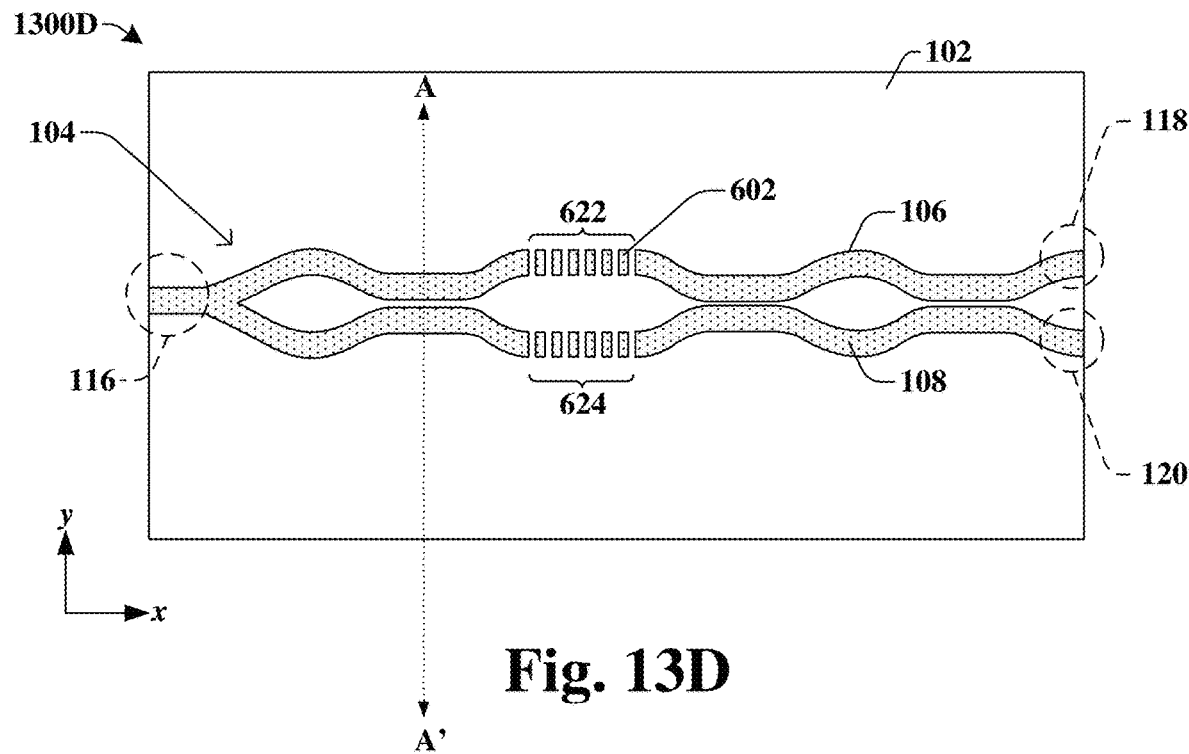

As shown in cross-sectional view 1300D of FIG. 13D, in some embodiments, the first waveguide 106 comprises a first subwavelength phase matching portion 622, and the second waveguide 108 comprises a second subwavelength phase matching portion 624. The first and second subwavelength phase matching portions 622, 624 comprise multiple sub-segments 602 that also change the effective indices of the waveguide structure 104 to improve the stability of the coupling ratio of the waveguide structure 104 even when there are process and/or frequency variations. Further details regarding the first and second subwavelength phase matching portions 622, 624 may be found in the description of FIG. 6 of the present disclosure.

Figure 13E:
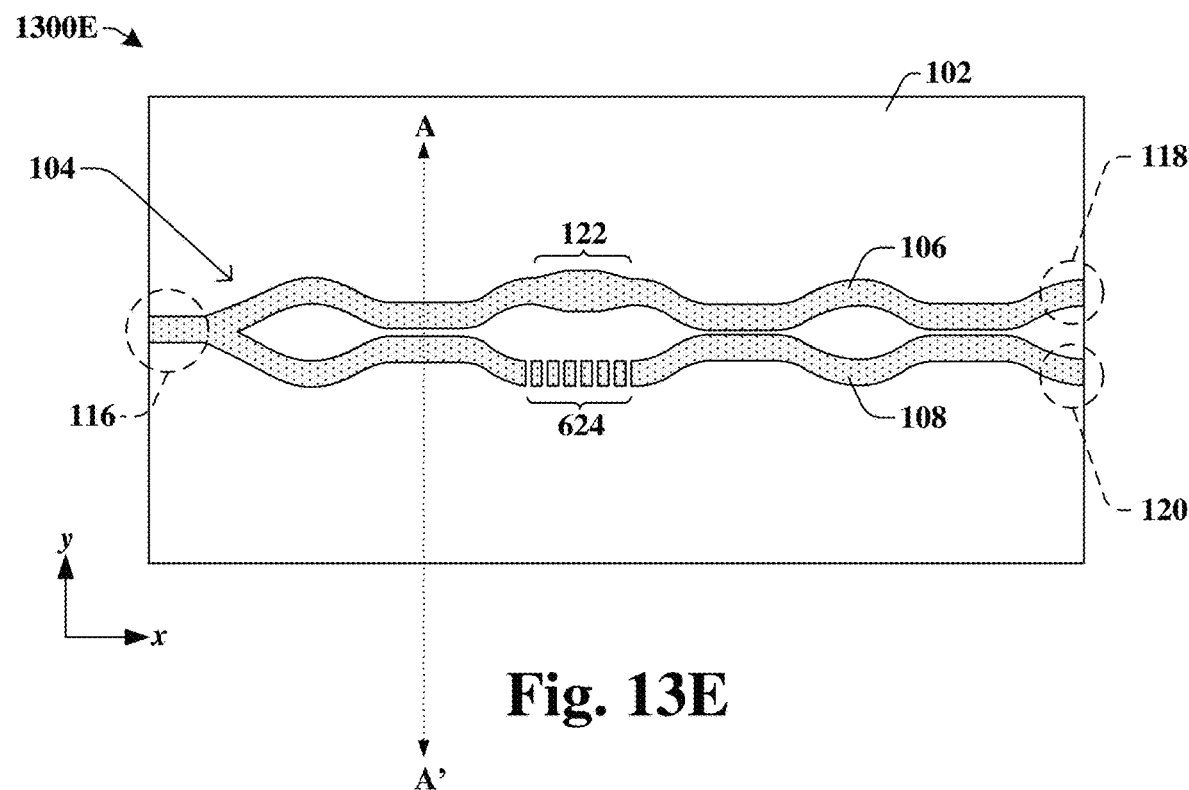

As shown in cross-sectional view 1300E of FIG. 13E, in yet some other embodiments, the first waveguide 106 may comprise the first tapered phase matching portion 122, whereas the second waveguide 108 comprises the second subwavelength phase matching portion 624. Such a combination may still improve the stability of the coupling ratio of the waveguide structure 104 by varying the optical path difference or phase difference of light traveling through the waveguide structure 104.

In some embodiments, after the formation of the first and second waveguides 106, 108, the method continues with the formation of dielectric layers, other semiconductor or optical devices, and/or interconnect structures over the base substrate 302 (not shown). In some other embodiments, the method proceeds from FIG. 13C to FIG. 14A to form a phase matching portion in the waveguide structure 104 of FIG. 13C to improve the stability of the coupling ratio of the waveguide structure 104.

Figure 14A:
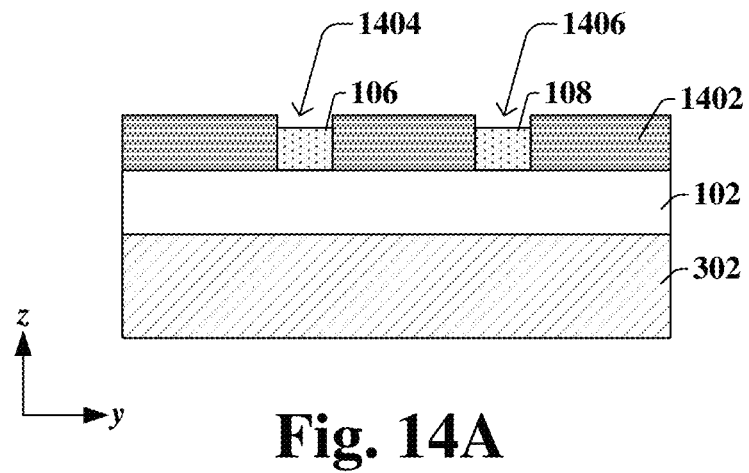

As shown in cross-sectional view 1400A of FIG. 14A, in some embodiments, a second masking structure 1402 is formed over the dielectric structure 102 and beside portions of the first and second waveguides 106, 108. The second masking structure 1402 comprises a first opening 1404 that exposes a portion of the first waveguide 106 and a second opening 1406 that exposes a portion of the second waveguide 108. The second masking structure 1402 may be formed using photolithography and removal (e.g., etching) processes. In some embodiments, the second masking structure 1402 comprises a photoresist material or a hard mask material.

Figure 14B:
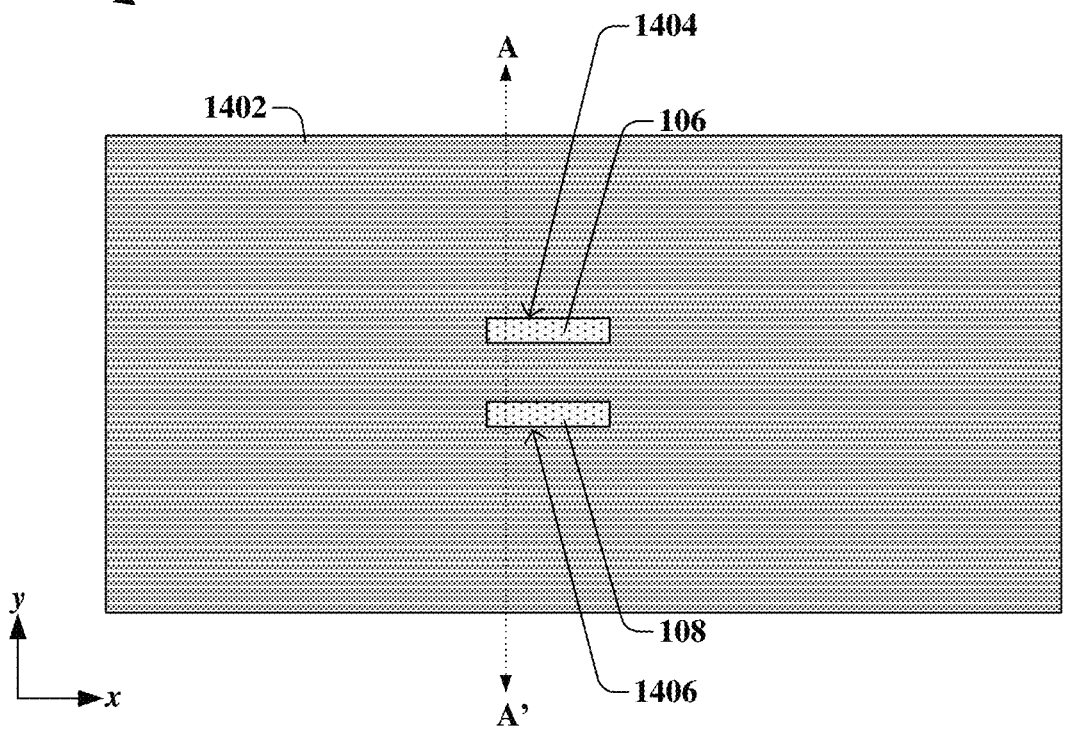

FIG. 14B illustrates a top-view 1400B that corresponds to some embodiments of the cross-sectional view 1400A of FIG. 14A. Cross-section line AA' of FIG. 14B may correspond to the cross-sectional view 1400A of FIG. 14A.

As shown in the top-view of FIG. 1400B, in some embodiments, the second masking structure 1402 covers a majority of the first and second waveguides 106, 108. In some embodiments, the first and second openings 1404, 1406 of the second masking structure 1402 are elongated in the x-direction to expose the first and second waveguides 106, 108.

Figure 15A:
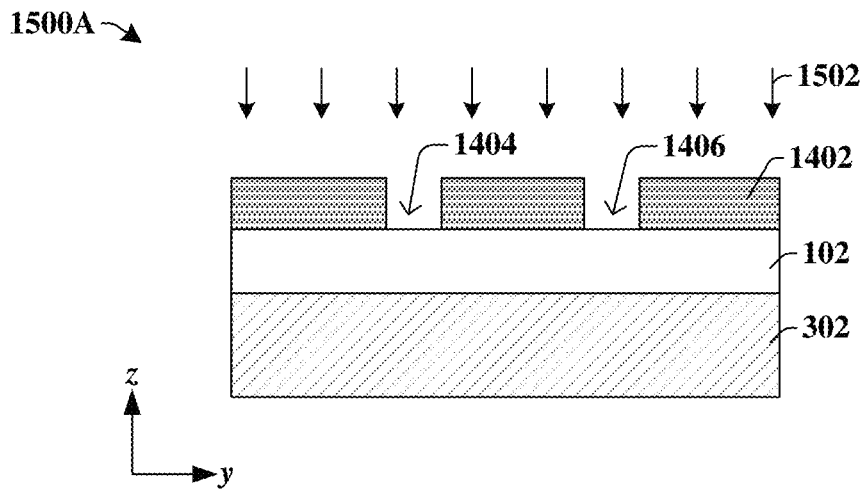

As shown in cross-sectional view 1500A of FIG. 15A, in some embodiments, a second removal process 1502 is performed to remove portions of the first and second waveguides 106, 108 according to the first and second openings 1404, 1406 of the second masking structure 1402. In some embodiments, the second removal process 1502 comprises an etching (e.g., wet or dry) process. In some such embodiments, the dielectric structure 102 is substantially resistant to removal by the second removal process 1502.

Figure 15B:
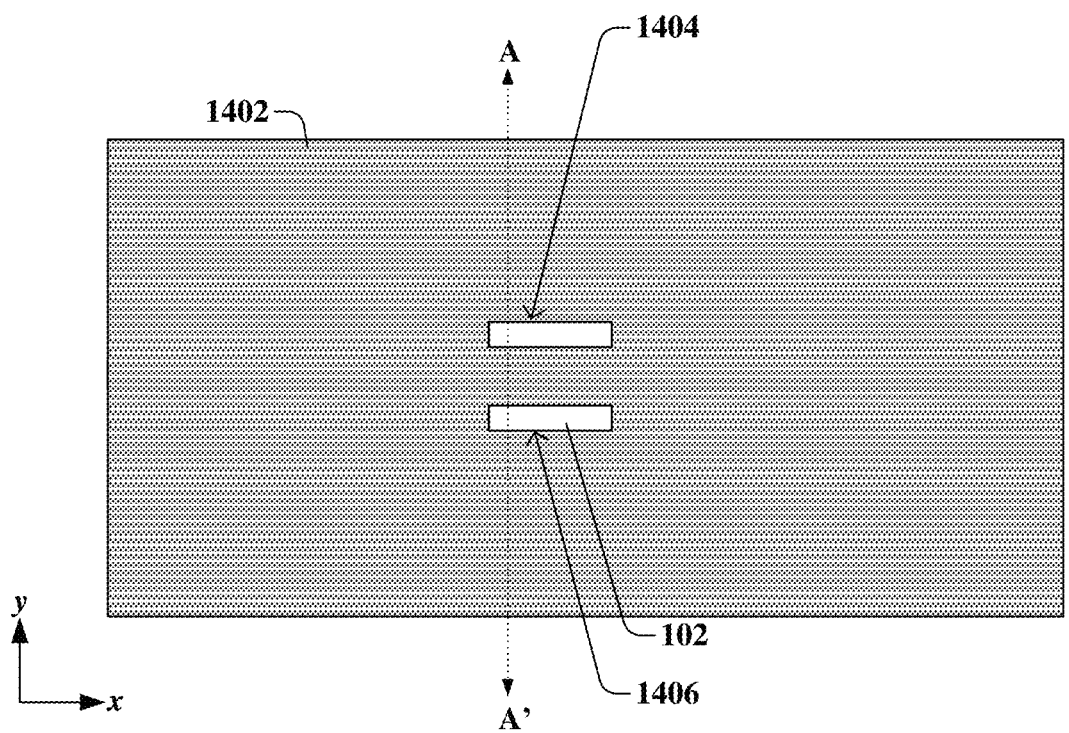

FIG. 15B illustrates a top-view 1500B that corresponds to some embodiments of the cross-sectional view 1500A of FIG. 14A. Cross-section line AA' of FIG. 15B may correspond to the cross-sectional view 1500A of FIG. 15A.

As shown in the top-view 1500B of FIG. 15B, in some embodiments, the dielectric structure 102 is visible from the first and second openings 1404, 1406 of the second masking structure 1402 after the second removal process (1502 of FIG. 15A).

Figure 16A:
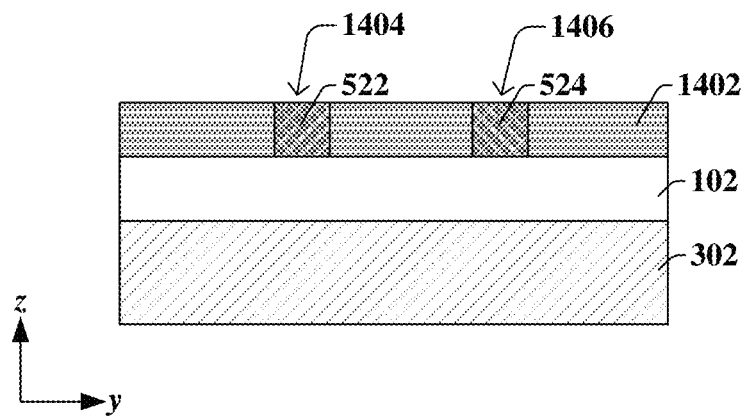

As shown in cross-sectional view 1600A of FIG. 16A, in some embodiments, an extrinsic material is formed within the first and second openings 1404, 1406 of the second masking structure 1402. The extrinsic material may be formed by a deposition process (e.g., physical vapor deposition (PVD), chemical vapor deposition (CVD), atomic layer deposition (ALD), sputtering, spin-on, etc.). In some embodiments, a removal process (e.g., etching, planarization, etc.) is also performed to remove any portions of the extrinsic material arranged above the second masking structure 1402. As a result, in some embodiments, a first extrinsic phase matching portion 522 is formed within the first opening 1404 of the second masking structure 1402, and a second extrinsic phase matching portion 524 is formed within the second opening 1406 of the second masking structure 1402.

The extrinsic material comprises a different material than the first and second waveguides (106, 108 of FIG. 14A). For example, in some embodiments, the extrinsic material of the first and second extrinsic phase matching portions 522, 524 comprises for example, III-V materials, metals, dielectric materials, polymers, or some other suitable material that is capable of transporting light. In some embodiments, if the material of the first and second extrinsic phase matching portions 522, 524 comprises a III-V material, then the refractive index of the III-V material is in a range of between, for example, approximately 3 and approximately 4. In some embodiments, if the material of the first and second extrinsic phase matching portions 522, 524 comprises a polymeric material, then the refractive index of the polymeric material is in a range of between, for example, approximately 1.5 and approximately 2.

Figure 16B:
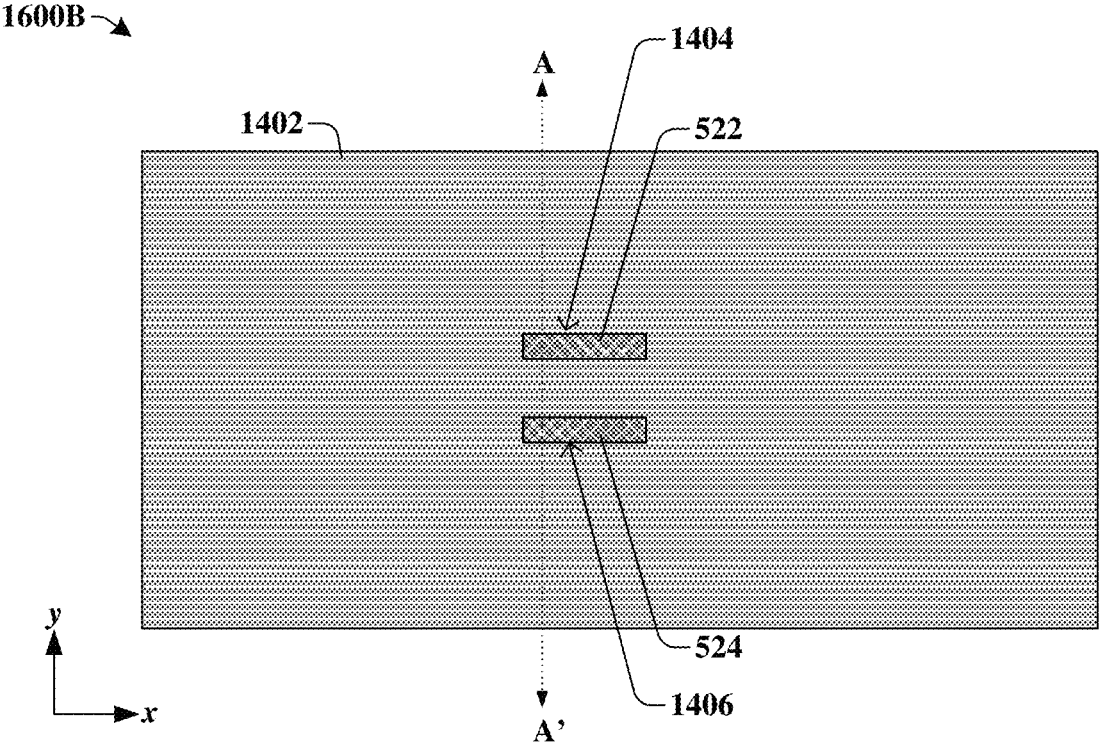

FIG. 16B illustrates a top-view 1600B that corresponds to some embodiments of the cross-sectional view 1600A of FIG. 16A. Cross-section line AA' of FIG. 15B may correspond to the cross-sectional view 1600A of FIG. 16A.

As shown in the top-view 1600B of FIG. 16B, in some embodiments, the extrinsic material completely fills the first and second openings 1404, 1406 of the second masking structure 1402.

Figure 17A:
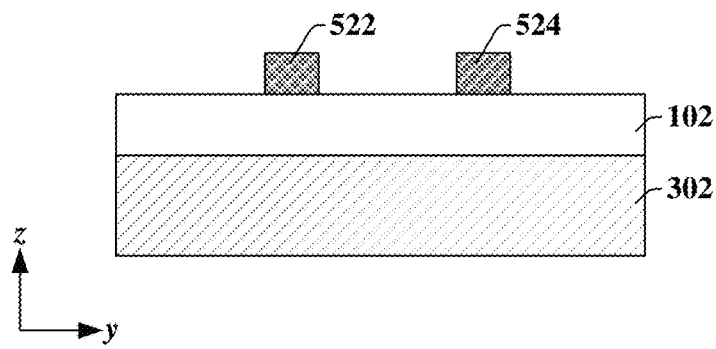

As shown in cross-sectional view 1700A of FIG. 17A, the second masking structure (1402 of FIG. 14A) is removed from the dielectric structure 102. In some embodiments, the second masking structure (1402 of FIG. 14A) is removed by way of an etching process, for example.

Figure 17B:
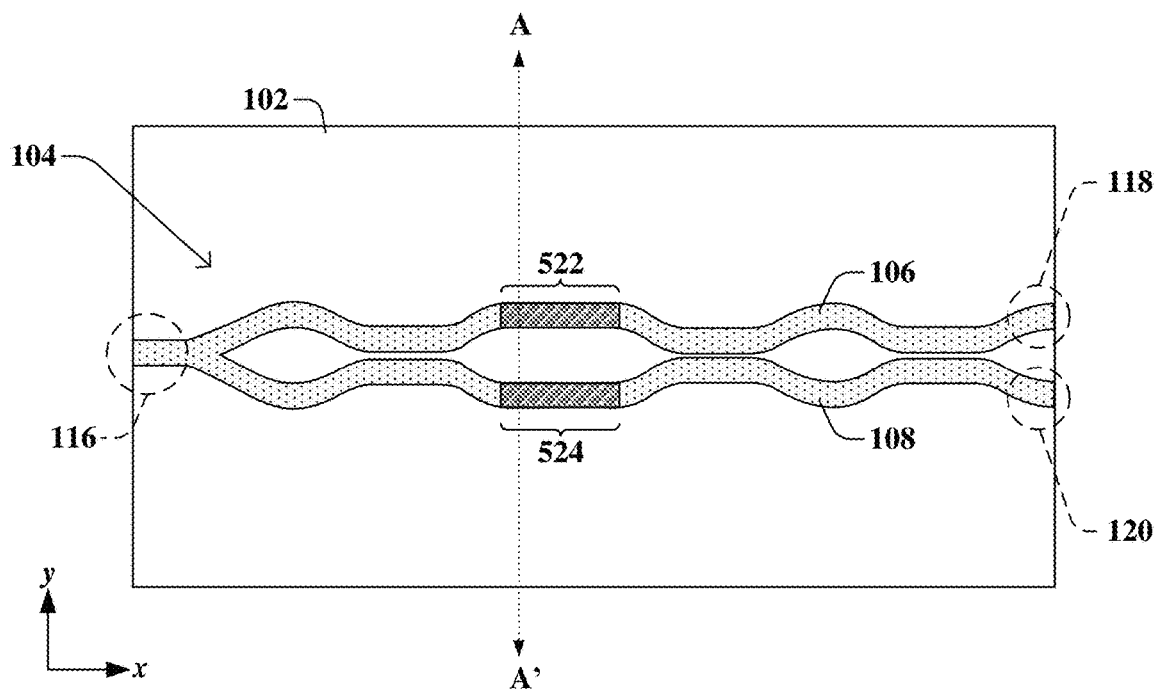

FIG. 17B illustrates a top-view 1700B that corresponds to some embodiments of the cross-sectional view 1700A of FIG. 17A. Cross-section line AA' of FIG. 17B may correspond to the cross-sectional view 1700A of FIG. 17A.

As shown in the top-view 1700B of FIG. 17B, in some embodiments, the first extrinsic phase matching portion 522 is coupled to surrounding portions of the first waveguide 106 but comprises a different material than the surrounding portions of the first waveguide 106. Similarly, the second extrinsic phase matching portion 524 is coupled to surrounding portions of the second waveguide 108 but comprises a different material than the surrounding portions of the second waveguide 108. In some embodiments, the first and second extrinsic phase matching portions 522, 524 comprise a same material, whereas in other embodiments, the first and second extrinsic phase matching portions 522, 524 could comprise different materials from one another. Nevertheless, by comprising a different material than surrounding portions of the first and second waveguides 106, 108, the first and second extrinsic phase matching portions 522, 524 change the refractive index (e.g., $n_{eff}$) of the waveguide structure 104 at the first and second extrinsic phase matching portions 522, 524, which changes the wave number $\beta$ and thus, phase of light traveling through the waveguide structure 104. As such, phase matching may be achieved to reduce variation of the coupling ratio and improve the reliability of the overall device.

Figure 18:
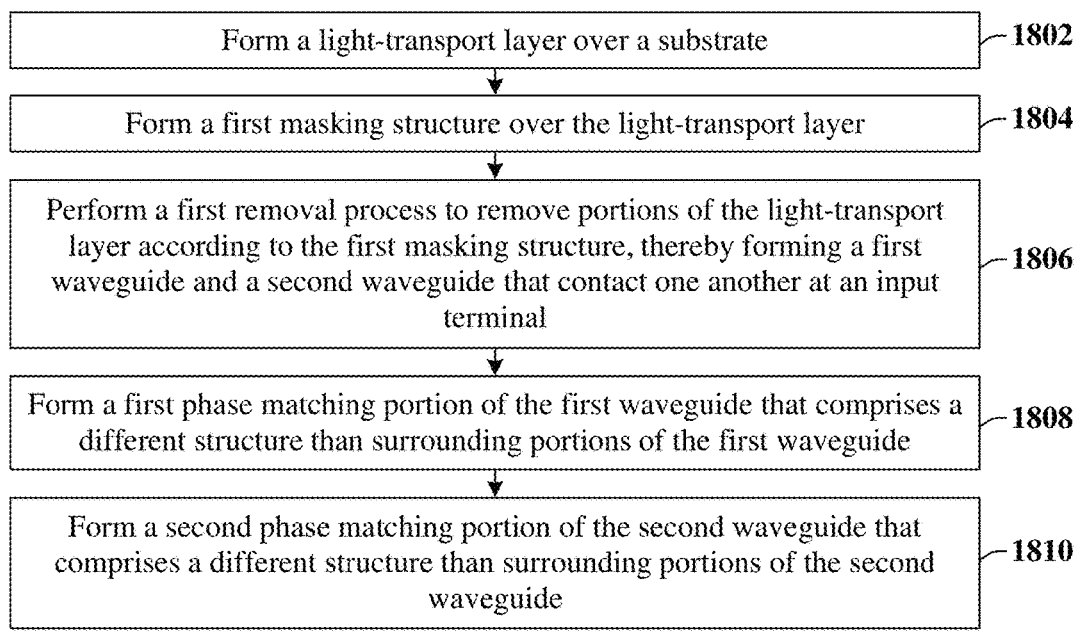
FIG. 18 illustrates a flow diagram of some embodiments of a method corresponding to the method of FIGS. 10-17B.

FIG. 18 illustrates a flow diagram of some embodiments of a method 1800 of forming a waveguide structure configured to split light according to a frequency- and process-insensitive coupling ratio.

While method 1800 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At act 1802, a light-transport layer is formed over a substrate. FIG. 10 illustrates a cross-sectional view 1000 of some embodiments corresponding to act 1802.

At act 1804, a first masking structure is formed over the light-transport layer. FIGS. 11A-11E illustrate various views 1100A-1100E, respectively, of some embodiments corresponding to act 1804.

At act 1806, a first removal process is performed to remove portions of the light-transport layer according to the first masking structure, thereby forming a first waveguide and a second waveguide that contact one another at an input terminal. FIGS. 13A-13E illustrate various views 1300A-1300E, respectively, of some embodiments corresponding to act 1806.

At act 1808, a first phase matching portion of the first waveguide is formed that comprises a different structure than surrounding portions of the first waveguide.

At act 1810, a second phase matching portion of the second waveguide is formed that comprises a different structure than surrounding portions of the second waveguide. FIGS. 14A through 16B illustrate various views 1400A through 1600B, respectively, of some embodiments corresponding to acts 1808 and 1810.

Therefore, the present disclosure relates to a waveguide structure comprising phase matching portions that have a different structure than other portions of the waveguide structure such that impingent light entering the waveguide structure can be split according to a frequency- and process-insensitive coupling ratio.

Accordingly, in some embodiments, the present disclosure relates to a device comprising: a first waveguide arranged over a substrate and having a first input terminal and a first output terminal, wherein the first input terminal is configured to receive light; and a second waveguide arranged over the substrate, laterally beside the first waveguide, and having a second input terminal and a second output terminal, wherein the second input terminal is configured to receive light; wherein the first waveguide further comprises a first portion that has a different structure than surrounding portions of the first waveguide, wherein the second waveguide further comprises a second portion that has a different structure than surrounding portions of the second waveguide, wherein the first waveguide is spaced apart at a maximum distance from the second waveguide at the first portion and the second portion, and wherein the first portion and the second portion are configured to adjust the phase of light traveling through the first waveguide and the second waveguide, respectively.

In other embodiments, the present disclosure relates to a device comprising: an input terminal configured to receive impingent light; a first waveguide having a first output terminal coupled to the input terminal and comprising a first phase matching portion that has a different structure than surrounding portions of the first waveguide; and a second waveguide optically coupled to the first waveguide and having a second output terminal coupled to the input terminal and comprising a second phase matching portion that has a different structure than surrounding portions of the second waveguide, wherein the first phase matching portion is spaced apart from the second phase matching portion, and wherein the first waveguide and the second waveguide are configured to split the impingent light based on a coupling ratio such that light exiting the first and second output terminals has a lower power than the power of the impingent light, wherein the first phase matching portion is configured to adjust the phase of light traveling through the first phase matching portion, and wherein the second phase matching portion is configured to adjust the phase of light traveling through the second phase matching portion.

In yet other embodiments, the present disclosure relates to a method comprising: forming a light-transport layer over a substrate, wherein the light-transport layer comprises a material configured to transport light; forming a first masking structure over the light-transport layer, wherein the first masking structure comprises a first portion spaced apart from a second portion, wherein the first and second portions contact one another at an input portion; performing a first removal process to remove portions of the light-transport layer that are uncovered by the first masking structure, thereby forming a first waveguide and a second waveguide contact one another at an input terminal; and forming a first phase matching portion of the first waveguide that comprises a different structure than surrounding portions of the first waveguide; and forming a second phase matching portion of the second waveguide that comprises a different structure than surrounding portions of the second waveguide.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device comprising:
a single light-input terminal;
a first waveguide branch that branches from the single light-input terminal at a branch location, the first waveguide branch having a first output terminal; and
a second waveguide branch that branches from the single light-input terminal at the branch location, the second waveguide branch arranged laterally beside the first waveguide branch and having a second output terminal, wherein light received at the single light-input terminal is split into the first waveguide branch and the second waveguide branch;
wherein the first waveguide branch comprises a first portion connecting surrounding portions of the first waveguide branch, the first portion comprising a first pair of tapered segments and a first elongated segment with a first width,
wherein the second waveguide branch comprises a second portion connecting surrounding portions of the second waveguide branch, the second portion comprising a second pair of tapered segments and a second elongated segment with a second width different from the first width, the second pair of tapered segments having the same structure but an asymmetric location as the first pair of tapered segments over a horizontal axis equally splitting the first waveguide branch and the second waveguide branch, and wherein the second elongated segment directly connects one of the surrounding portions of the second waveguide branch of a constant width extending from the second elongated segment to a linear portion of the second waveguide branch,
wherein the first portion and the second portion are configured to adjust a phase difference of light traveling through the first waveguide branch and the second waveguide branch, and
wherein the surrounding portions of the first waveguide branch and the second waveguide branch each have the constant width through their entire lengths.

2. The device of claim 1, wherein the first elongated segment is disposed between the first pair of tapered segments.

3. The device of claim 1, wherein the first elongated segment directly connects the first pair of tapered segments.

4. The device of claim 1, wherein the first pair of tapered segments respectively has a variable width gradually changing from the constant width of the surrounding portions of the first waveguide branch to the first width.

5. The device of claim 4, wherein the first width is greater than the constant width of the surrounding portions of the first waveguide branch.

6. The device of claim 1, wherein the second elongated segment directly connects one of the second pair of tapered segments.

7. The device of claim 1, wherein the second pair of tapered segments directly contact one another and further connects another one of the surrounding portions of the second waveguide branch on an opposite side to the second elongated segment.

8. A device comprising:
an input terminal configured to receive impingent light;
a first waveguide having a first output terminal, the first waveguide splitting off of the input terminal at a branch location and comprising a first phase matching portion connecting surrounding portions of the first waveguide, the first phase matching portion comprising a first pair of tapered segments and a first elongated segment; and a second waveguide having a second output terminal, the second waveguide splitting off of the input terminal at the branch location and comprising a second phase matching portion connecting surrounding portions of the second waveguide, the second phase matching portion comprising a second pair of tapered segments and a second elongated segment, wherein the second pair of tapered segments has the same structure as the first pair of tapered segments, wherein the second elongated segment has a constant width and directly connects to one of the second pair of tapered segments and one of the surrounding portions, wherein the second elongated segment has a same length and a different effective refractive index than the first elongated segment, wherein the first phase matching portion and the second phase matching portion are configured to adjust a phase difference of light traveling through the first phase matching portion and the second phase matching portion, wherein the first pair of tapered segments has a first ending sidewall vertically aligned with a first ending sidewall of the second pair of tapered segments and a second ending sidewall vertically aligned with an ending sidewall of the second elongated segment opposite to the second pair of tapered segments, and wherein the surrounding portions of the first waveguide and the second waveguide each have the constant width through their entire lengths.

9. The device of claim 8, wherein the first elongated segment comprises a different material than the second elongated segment.

10. The device of claim 8, wherein the first elongated segment or the second elongated segment comprises multiple sub-segments space apart from one another with each of the multiple sub-segments completely covered by a dielectric structure that surrounds the first waveguide and the second waveguide.

11. The device of claim 8, wherein the second pair of tapered segments having an asymmetric location as the first pair of tapered segments.

12. The device of claim 11, wherein the constant width of the second elongated segment is equal to a width of the second pair of tapered segments on a smaller end.

13. The device of claim 11, wherein the first elongated segment is disposed between and directly connects the first pair of tapered segments.

14. The device of claim 11, wherein the surrounding portions have the constant width extending from the second elongated segment to a linear portion of the second waveguide.

15. A device comprising:
a single light-input terminal arranged over a substrate;
a first waveguide branching off the single light-input terminal at a branch location and extending generally in a first direction over the substrate from the branch location to a first output terminal, the first waveguide including a first phase matching portion arranged between the branch location and the first output terminal, the first phase matching portion including a first elongated segment arranged between a first pair of tapered segments, the first elongated segment having a first width measured in a second direction perpendicular to the first direction, and the first pair of tapered segments having widths measured in the second direction that become narrower with increasing distance in the first direction from the first elongated segment; and a second waveguide branching off the single light-input terminal at the branch location and extending generally in the first direction over the substrate from the branch location to a second output terminal, the second waveguide including a second phase matching portion that is arranged between the branch location and the second output terminal, wherein the second phase matching portion comprises a second elongated segment and a second pair of tapered segments, the second pair of tapered segments to one side of the second elongated segment, the second elongated segment having a second width measured in the second direction and different from the first width;

wherein a first outermost edge of the first pair of tapered segments is aligned with an outermost edge of the second elongated segment, and a second outermost edge of the first pair of tapered segments is aligned with an outermost edge of the second pair of tapered segments, and wherein surrounding portions of the first waveguide and the second waveguide each have a constant width through their entire lengths.

16. The device of claim 15, wherein the first elongated segment has a first length measured in the first direction, and the second elongated segment has a second length measured in the first direction, the first length being equal to the second length.

17. The device of claim 15, wherein the first elongated segment is made of a first material having a first refractive index, and the second elongated segment is made of a second material having a second refractive index that differs from the first refractive index.

18. The device of claim 15, where the substrate is a handle substrate of a silicon-on-insulator (SOI) substrate, and the single light-input terminal, the first waveguide, and the second waveguide are each disposed in an active layer of the SOI substrate, and wherein an insulator layer of the SOI substrate separates the handle substrate from the active layer.

19. The device of claim 15, wherein the first phase matching portion is configured to adjust a phase difference of light traveling through the first waveguide by a first amount and the second phase matching portion is configured to adjust a phase difference of light traveling through the second waveguide by a second amount.

\* \* \* \* \*